United States Patent
Moffat et al.

(10) Patent No.: US 9,223,239 B2
(45) Date of Patent: Dec. 29, 2015

(54) TONER RESINS AND PROCESSES FOR MAKING THE SAME

(71) Applicant: XEROX CORPORATION, Norwalk, CT (US)

(72) Inventors: Karen A. Moffat, Brantford (CA); Yulin Wang, Oakville (CA); Shigang Steven Qiu, Toronto (CA); John Lawrence Pawlak, Rochester, NY (US); Alexander N. Klymachyov, Webster, NY (US); Kevin F. Marcell, Webster, NY (US); Judith M. Vandewinckel, Livonia, NY (US); Wafa F. Bashir, Mississauga (CA); Richard P. N. Veregin, Mississauga (CA); Christopher M. Wolfe, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 58 days.

(21) Appl. No.: 14/255,771

(22) Filed: Apr. 17, 2014

(65) Prior Publication Data

US 2015/0301466 A1  Oct. 22, 2015

(51) Int. Cl.
 *G03G 9/08* (2006.01)
 *G03G 9/087* (2006.01)
 *C08F 283/02* (2006.01)

(52) U.S. Cl.
 CPC .......... *G03G 9/08755* (2013.01); *C08F 283/02* (2013.01); *G03G 9/0802* (2013.01); *G03G 9/0806* (2013.01)

(58) Field of Classification Search
 CPC ............ G03G 9/08755; G03G 9/0804; G03G 9/0806; C08F 283/02
 USPC ............. 430/109.4, 137.14, 137.15; 525/468, 525/274
 See application file for complete search history.

(56) References Cited

U.S. PATENT DOCUMENTS

| | | | |
|---|---|---|---|
| 2,766,292 A | 10/1956 | Monson et al. |
| 3,590,000 A | 6/1971 | Palermiti |
| 3,800,588 A | 4/1974 | Larson et al. |
| 4,131,731 A | 12/1978 | Lai et al. |
| 4,295,990 A | 10/1981 | Verbeek et al. |
| 4,298,672 A | 11/1981 | Lu |
| 4,338,390 A | 7/1982 | Lu |
| 4,533,614 A | 8/1985 | Fukumoto et al. |

(Continued)

FOREIGN PATENT DOCUMENTS

| JP | 10077336 A2 | 3/2001 |
|---|---|---|
| JP | 10087802 A2 | 4/2001 |
| JP | 10095840 A2 | 4/2001 |

OTHER PUBLICATIONS

Wang, et al., entitled Process to Prepare Polyester Phase Inversion Latexes, U.S. Appl. No. 3/945,735, filed Jul. 19, 2013.

*Primary Examiner* — Mark A Chapman
(74) *Attorney, Agent, or Firm* — Pillsbury Winthrop Shaw Pittman LLP

(57) ABSTRACT

Amorphous polyester resins and processes for making the same are disclosed herein. In particular, the process for making the resin provides resins with improved properties. The amorphous polyester resins have substantially reduced free fumaric acid as compared to that made from conventional processes. The toner resins are used to prepare toner compositions the have improved performance.

20 Claims, 10 Drawing Sheets

(56) References Cited

U.S. PATENT DOCUMENTS

| | | |
|---|---|---|
| 4,727,011 A | 2/1988 | Mahabadi et al. |
| 4,788,122 A | 11/1988 | Kawabe et al. |
| 4,988,794 A | 1/1991 | Kubo et al. |
| 5,227,460 A | 7/1993 | Mahabadi et al. |
| 5,290,654 A | 3/1994 | Sacripante et al. |
| 5,302,486 A | 4/1994 | Patel et al. |
| 5,332,860 A | 7/1994 | Moore et al. |
| 5,366,841 A | 11/1994 | Patel et al. |
| 5,373,030 A | 12/1994 | Kaplan et al. |
| 5,407,772 A | 4/1995 | Bayley et al. |
| 5,449,719 A | 9/1995 | Sacripante et al. |
| 5,466,554 A | 11/1995 | Sacripante et al. |
| 5,686,218 A | 11/1997 | Liebermann et al. |
| 5,714,568 A | 2/1998 | Nava |
| 6,063,827 A | 5/2000 | Sacripante et al. |
| 6,127,080 A | 10/2000 | Sacripante et al. |
| 8,257,899 B2 * | 9/2012 | Sacripante ............... 430/137.14 |
| 8,466,254 B2 | 6/2013 | Sacripante |

\* cited by examiner

TONER RESINS AND PROCESSES FOR MAKING THE SAME

CROSS-REFERENCE TO RELATED APPLICATIONS

Reference is made to commonly owned and co-pending, U.S. patent application Ser. No. 14/255,874 entitled "Toner Resins and Processes for Making the Same" to Karen Moffat et al., electronically filed on the same day herewith.

BACKGROUND

The present disclosure relates to unsaturated polyester resins and processes for making the same. In particular, the process for making the resin provides resins with improved properties. The unsaturated polyester resins of the present embodiments can be used as toner resins to prepare toner compositions. In specific embodiments, the toner composition is an emulsion aggregation (EA) toner.

Polyester resins are generally prepared by a polycondensation process involving the reaction of a diol monomer and a diacid or diester monomer and producing water or an alcohol as byproduct, which is collected by distillation. Unsaturated polyester resins can be similarly prepared by this process, with the primary exception that the diacid monomer is unsaturated, that is, it is comprised of an alkene segment such as fumaric or maleic acid or diesters thereof. Electrophotographic toners are generally comprised of a resin, such as a polyester, a pigment and optionally a charge control agent. Many various toner formulations are known, and more specifically, one preferred toner formulation is comprised of a crosslinked unsaturated polyester resin, such that desirable low fixing temperatures and offset properties are attained, reference, for example, U.S. Pat. No. 5,227,460, the disclosure of which is totally incorporated herein by reference, wherein there is disclosed as one preferred unsaturated polyester resin a poly(propoxylated bisphenol co-fumarate) which is crosslinked to a gel content of up to about 40 weight percent utilizing a peroxide to provide a toner useful for electrophotographic processes.

Unsaturated polyester resins derived from propoxylated bisphenol A with fumaric acid are known. More specifically, the propoxylated bisphenol A utilized is comprised for example, of a mixture of monomers prepared by the anionic propoxylation of bisphenol A with propylene oxide, in the presence of an alkali hydroxide catalyst in a pressurized vessel, and wherein the mixtures obtained are the alkali salts of 4-(2-hydroxyethyl)-bisphenol A, bis 4,4'-(2-hydroxyethyl)-bisphenol A, and 4-(2'-hydroxyethyl-2-oxyethyl)-4'-(2-hydroxyethyl)-bisphenol A. There exists, an alternative condensation method of alkoxylation that can be accomplished by the reaction of a diol with a cyclic alkylene carbonate, and specifically wherein bisphenol A can be condensed with a cyclic propylene carbonate in the presence of a catalyst and release carbon dioxide as the byproduct at elevated temperatures, thus producing a mixture of propoxylated bisphenol A. This latter condensation method has numerous economic advantageous in terms of monomer costs, and simplicity.

In U.S. Pat. No. 5,449,719, the disclosure of which, is totally incorporated herein by reference, there is illustrated a two-step process for the preparation of unsaturated polyester resin, and which comprises the first reaction of a phthalate and a glycol to provide a transesterified product, and subsequently a second reaction comprising reacting the product with an unsaturated dicarboxylate monomer. This differs from the present invention in that for example, the first reaction comprises the condensation of a diol with an alkylene carbonate and generates carbon dioxide as the byproduct.

In U.S. Pat. No. 5,407,772, the disclosure of which is totally incorporated herein by reference, there is illustrated an unsaturated linear polyester having repeating units of a reaction product of a first monomer, a second monomer, a third monomer and optionally a fourth monomer. The linear polymers have a glass transition temperature ranging from about 52° C. to about 61° C. average molecular weight less than 200, the second monomer may be a dicarboxylic acid or diester which is different than the third monomer. The concentration of second residues of the polymer, derived from the second monomer, ranges from about 3 weight percent to about 15 weight percent, based on the total weight of the polymer. The third monomer is an aromatic dicarboxylic acid or an ester thereof. The fourth monomer is a diol having a higher molecular weight than the first monomer. In a process for preparing the inventive polymer of '772, the first, the second, the third monomer (and optionally a fourth) and/or a catalyst undergo trans-esterification to form the unsaturated, linear polyester.

In U.S. Pat. No. 4,788,122, there is disclosed the production of a toner polyester resin obtained by co-polycondensation of (a) a diol component of polyalkylene-bis(4-hydroxyphenyl)propane and (b) an acid component, improved by incorporating into the acid component a copolymer of styrene or derivative thereof and a carboxylic vinyl monomer.

In U.S. Pat. No. 5,466,554, there is disclosed a toner composition with modified polyester resin free of acid end groups, and obtained from the condensation of a first diol monomer, a second diacid monomer and third monovalent alcohol or acid monomer. Similarly, in U.S. Pat. No. 5,686,218 there disclosed a process which comprises reacting a polyester resin end capped with hydroxyl moieties or groups with an organic acid anhydride at a temperature from about 125° C. resulting in a polyester resin end-capped with acid moieties or acid groups. Other polyester based toners and process thereof are illustrated in U.S. Pat. Nos. 4,988,794; 4,727,011; 4,533, 614 and 5,366,841.

In U.S. Pat. No. 2,766,292, there is disclosed a process for preparing oxyalkyating derivatives such as anhydrous, substantially undiluted oxyalkylated derivatives from an anhydrous solid, oxyalkylation-susceptible pentaerythritol compound, which satisfies one of the following two conditions (a) it is infusible; (b) it suffers at least partial decomposition if maintained at its beginning of-fusion temperature for a period of at least 15 minutes in the presence of an oxyalkylation catalyst, and which solid is insoluble in oxyalkylation-resistant, distillation separable solvent; which process consists of reacting the solid with at least one alkylene carbonate selected from ethylene carbonate, propylene carbonate, and butylene carbonate, in the presence of an oxyalkylation catalyst at a temperature producing carbon dioxide.

In U.S. Pat. No. 4,131,731, there is disclosed a process for preparing linear polycarbonates containing terminal hydroxyl groups with the essential exclusion of other terminal groups by reacting glycols having a carbon number greater than 4 and cyclic esters of carbonic acid via ester interchange reaction at 100° C. to 300° C. and 0.1-300 mm Hg.

In U.S. Pat. No. 5,373,030 there is disclosed a process for the preparation of polyurethane foams and similarly, in U.S. Pat. No. 5,332,860 there is illustrated the use of polyols for preparing polyurethane foams having improved retention of insulative properties.

In U.S. Pat. No. 5,714,568 there is disclosed a process comprising the reaction of a polyfunctional organic acid or anhydride and a cyclic organic carbonate compound in the presence of a catalyst selected from the group consisting of an alkali metal, thereby generating a polyester or copolyester resin.

Japanese Patent Publication JP 10077336 A2 discloses a process for the preparation of copolyesters by the reaction of an aromatic diol with an alkylene carbonate in the presence of an alkali carbonate catalyst to form a diol, at a conversion of, for example, more than about 75 percent as measured by the evolution of carbon dioxide byproduct, followed by the subsequent addition of yet another diol and a diacid and continuing the polymerization at high pressure and temperature of about 240 yield the aforesaid copolyester resin. The isomeric mixtures in the present invention comprised, for example, of isomers I, II and III are not believed to be disclosed in the JP '336 documents particularly in the isomer ratios of from about 0 to about 5 weight percent of isomer I, of from about 89 to about 97 weight percent of isomer II, and from about 0 to about 15 weight percent of isomer III, by the utilization of a mixture of both an alkali carbonate and an alcohol. The process of the present invention differs, for example, in that the specific mixtures amounts of the three isomers are controlled and obtained by the use of specific catalyst in a multistep process to form polyester resins that can be selected for use as toner binders. Furthermore, the unsaturated polyester, poly(propoxylated bisphenol A—co-fumarate) is not apparently disclosed in the above JP '336 document. The unsaturated polyesters of the present invention are of importance for crosslinking to a high gel content of for example, from about 5 to about 50 percent gel. Additionally, in the process of the present invention, high pressures are not necessarily utilized in forming the polyester resins, and in embodiments the highest temperature selected to generate the polyester resin is from about 200° C. JP '336 patent utilizes both a diol and diacid during the polymerization steps to form a copolyester. This differs from the present invention wherein in embodiments a diacid is utilized to form the polyester during the polycondensation step.

Japanese Patent publication JP 10095840 A2 discloses a process for the preparation of copolyesters by the reaction of an aromatic diol with an alkylene carbonate in the presence of an alkali carbonate catalyst to form a diol, at a conversion of for example, more than about 75 percent as measured by the evolution of carbon dioxide byproduct, followed by the subsequent addition of yet another diol and a mixture of diacid and continuing the polymerization at high pressure and temperature of about 240° C. mixtures in the present invention are comprised of isomers I, II and III which do not appear to be recognized or disclosed in the JP '840 documents, particularly in a three step monomer processes to produce the isomer ratios of from about 0 to about 1 weight percent of isomer I, of from about 89 to about 97 weight percent of isomer II, and from about 3 to about 15 weight percent of isomer III, by the utilization of a mixture of both an alkali carbonate and alcohol derived alkali. Furthermore, the aforementioned '840 patent utilizes both a diol and diacid during the polymerization steps to form a copolyester. This differs from the present invention wherein in embodiments only a diacid need be utilized to form the polyester during the polycondensation step.

Japanese Patent Publication JP 10087802 A2 discloses a process for the preparation of polyesters obtained by polymerizing an aromatic dicarboxylic acid and aliphatic glycol to form a carboxylic group-terminated polyester oligomer with esterification degree of about 80 percent conversion, and melt reacting with an aromatic diol and cyclic 5 or 6 member alkylene carbonate in the presence of a catalyst such as lithium diacetate. It is a feature of the present invention to provide economical process for the preparation of polyester resins.

It is desirable to use a multistep "one pot" economical process for the preparation of polyester resins, such as an unsaturated polyester resin. While such processes have been devised, such as described in U.S. Pat. Nos. 8,466,254, 6,063,827 and 6,127,080, which are hereby incorporated by reference in their entireties, it has been discovered that producing such polyester resins for use in toners on a large scale, such as during commercial manufacturing, have shown to contain unacceptably high levels of particle fines. Particle fines are those considered too small, and are in the size range of from about 1.4 to about 3.17 microns. High levels of particle fines are undesirable as they hinder toner performance and can lead to poor imaging quality. Extensive analysis revealed that unreacted fumaric acid in the resin caused the formation of particle fines.

Thus, there is a need to optimize the resin formulation and process to address these issues and provide improved toner performance.

SUMMARY

The present embodiments provide a process for making a toner resin comprising: a process for making a toner resin emulsion comprising: reacting an organic diol with a cyclic alkylene carbonate in the presence of a first catalyst to thereby form a polyalkoxy diol; reacting the polyalkoxy diol with one or more diacid reagents in the presence of a second catalyst in an esterification reaction; monitoring an acid value of a resulting mixture produced from the esterification reaction; subsequently polycondensing the resulting mixture with an unsaturated diacid to form an unsaturated polyester resin; dissolving the unsaturated polyester resin in an organic solvent to form a solution; neutralizing the solution of the polyester resin; adding a sufficient amount of water to the neutralized solution to form a resinemulsion; and removing the organic solvent in the resin emulsion.

In specific embodiments, there is provided a process for making toner resin comprising: a process for making a toner emulsion comprising: reacting an organic diol with a cyclic alkylene carbonate in the presence of a first catalyst to thereby form a polyalkoxy diol, wherein the first catalyst is present in an amount of from about 0.001 mole percent to about 0.5 mole percent based on the starting organic diol utilized; reacting the polyalkoxy diol with one or more diacid reagents in the presence of a second catalyst in an esterification reaction; monitoring an acid value of a resulting mixture produced from the esterification reaction; subsequently polycondensing the resulting mixture with an unsaturated diacid to form an unsaturated polyester resin having an acid value of greater than 10.0 mg KOH/g resin; dissolving the unsaturated polyester resin in an organic solvent to form a solution; neutralizing the solution of the polyester resin; adding a sufficient amount of water to the neutralized solution to form a resin emulsion; and removing the organic solvent in the resin emulsion.

In yet further embodiments, there is provided a process for making toner resin comprising: a process for making a toner comprising: reacting an organic diol with a cyclic alkylene carbonate in the presence of a first catalyst to thereby form a polyalkoxy diol; reacting the polyalkoxy diol with one or more organic diacid reagents in the presence of a second catalyst in an esterification reaction; monitoring an acid value of a resulting mixture produced from the esterification reaction; subsequently polycondensing the resulting mixture with an unsaturated diacid to form an unsaturated polyester resin having an acid value greater than 10.0 mgKOH/g resin; dissolving the amorphous polyester resin in an organic solvent to form a solution; neutralizing the solution of the polyester resin; adding a sufficient amount of water to the neutralized solution to form a resin emulsion; removing the organic solvent from the resin emulsion; aggregating the emulsion to form toner particles; and coalescing the toner particles to form the toner.

In embodiments, the formed unsaturated polyester resin has an acid value of from about 10.0 to about 14.0 mgKOH/g resin and a viscosity range of from about 32 to about 40 poise. The viscosity range may be measured at 200° C. using a Brookfield viscometer.

BRIEF DESCRIPTION OF THE FIGURES

For a better understanding of the present embodiments, reference may be had to the accompanying figures.

DETAILED DESCRIPTION

The present invention is generally directed to a process for the preparation of polyester polymers, and which polyesters can be selected for the preparation polyester polymers which are preferably subsequently crosslinked for utilization as toner resins. In embodiments, the process of the present invention comprises a monomer addition procedure of, for example, first alkoxylating a dihydroxy containing monomer, such as a dihydroxy alkane or dihydroxy arylene, with a cyclic alkylene carbonate in the presence of a catalyst such as an alkali carbonate, optionally followed by the addition of a further amount of cyclic alkylene carbonate in the presence of a second catalyst such as an alkali alkoxide, and followed by a subsequent addition of a diacid, such as a saturated or unsaturated aliphatic diacid or aromatic diacid, to enable the formation of a saturated or unsaturated polyester resin.

In particular, the present embodiments provide an unsaturated polyester resin that has reduced levels of starting material and thus improves machine performance of the toners incorporating such resins. The present embodiments further provide modifications to the process of making such resins, in particular, the optimization of the resin esterification step and polycondensation step of the resin synthesis, that were discovered to yield the desired results.

When certain unsaturated polyester resins were used to prepare toner particles at manufacturing scale, the particle batchs were discovered to contain unacceptably high level of particle fines. As a consequence, the resulting toner showed poor machine performance. After extensive analytical evaluation, between the unsaturated polyester resin of the present embodiments and control polyester resins, it was found that the cause of the particle fine formation was the level of unreacted starting materials, such as fumaric acid, in the resin.

Figure 1:
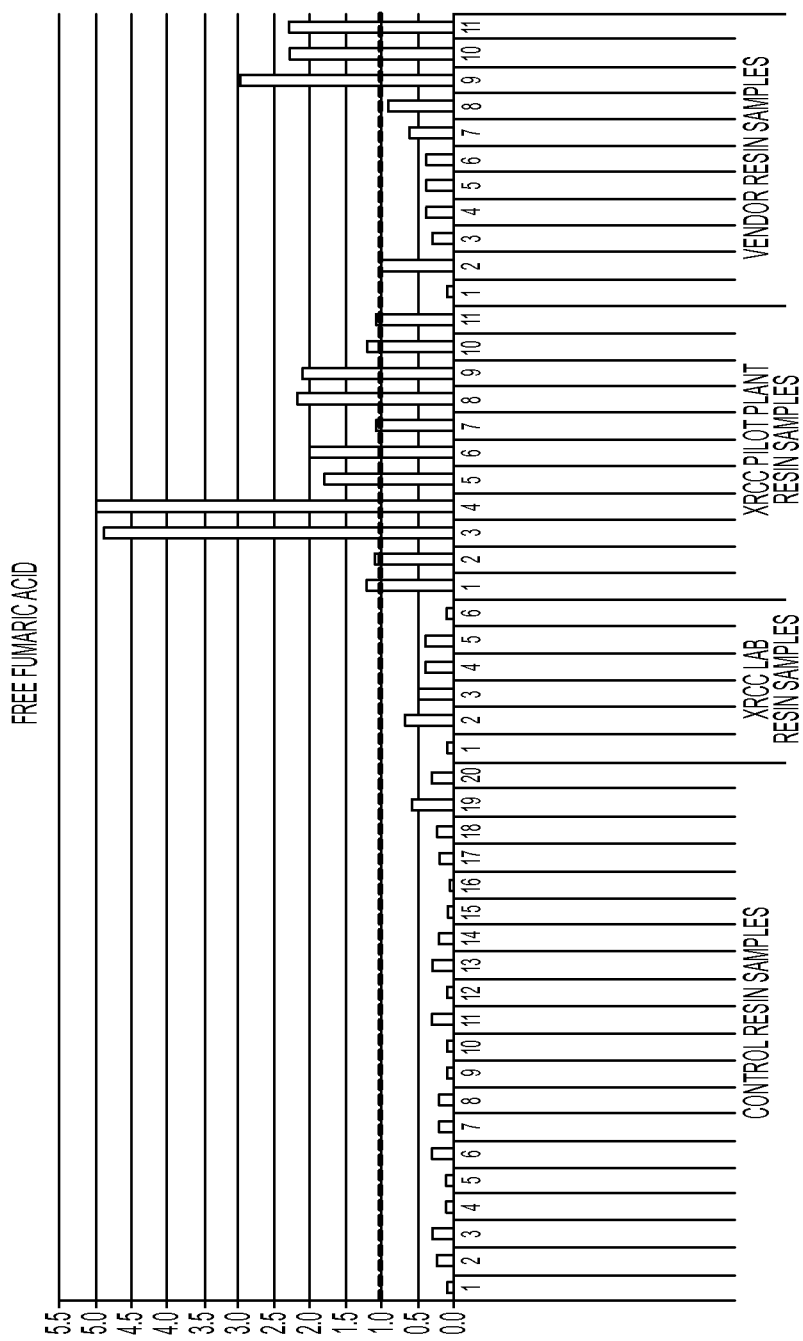
FIG. 1 represents a graphical representation of levels of unreacted fumaric acid detected in control resin versus various batches of the resin of the present embodiments by 31P NMR analysis.

31P NMR analysis was used to identify the unreacted starting material in the unsaturated polyester resin. FIG. 1 illustrates the level of unreacted fumaric acid in the control polyester resins (which comprise propoxylated-bisphenol A derived from propylene oxide with bisphenol A, terephathlic acid, dodecenylsuccinic anhydride and fumaric acid as compared to various batches of the unsaturated polyester resin produced by either Xerox Research Centre of Canada (XRCC) laboratory, by pilot plant on a manufacturing scale or by an outside vendor.

31P NMR analysis has been used to characterize functional groups at the end of polyester chains by reacting the diacid or diol groups with a chloro-phospholane compound (2-chloro-4,4,5,5-tetramethyl-1,3,2-dioxaphospholane). During this analysis chloro-phospholane also reacts with any unreacted starting material producing a distinct NMR peak for the impurity. Using this technique, the inventors have been able to detect and quantify the presence of unreacted fumaric acid in different batches of the unsaturated polyester resin. As shown in FIG. 1, the amount of free fumaric acid in the control resin batches is very low on average <0.5 whereas many batches of the unsaturated polyester resin produced by either XRCC or the outside vendor were significantly higher in unreacted fumaric acid.

It was also found that resin dispersion from the unsaturated polyester resin lots with high levels of unreacted starting material, such as fumaric acid, was very difficult to prepare into a dispersion and that filtration of the cut resin to remove the complexed free fumaric acid was required to prepare a stable phase inversion emulsion from the resin. The method of filtration used is disclosed in U.S. patent application Ser. No. 13/945,735 filed Jul. 19, 2013, which is hereby incorporated by reference in its entirety. When the level of unreacted fumaric acid is low, the dispersion of the unsaturated polyester resin is much more readily obtained. Thus, while there is a method of reducing the starting material that can be used after the resin is synthesized, it is much more preferable and efficient to synthesis a resin that has low levels of unreacted starting material to begin with.

In order to reduce the amount of free fumaric acid in the unsaturated polyester resin, three parameters were studied: (1) level of catalyst (in this case, butyl stannoic acid catalyst (Fascat 4100)) added at the beginning of the polymerization; (2) acid value of the resin at the end of the first stage of polyesterification prior to the addition of fumaric acid; and (3) polymerization temperature during the second stage of the reaction when fumaric acid is added. The levels of each factor studied were: 5, 3 and 1.5 for the acid value of the resin after esterification prior to fumaric acid addition, catalyst loading of 0.279 and 0.074 weight percent, and second stage polycondensation temperature of either 210° C. or 235° C. A total of 13 resins were produced in which these parameters were varied. It was discovered that increasing the second stage polymerization temperature from 210° C. to 235° C. resulted in very dark brown resin and high weight average molecular weight (Mw) which was not desirable. As a consequence, the multiple regression analysis of only two factors; catalyst loading and acid value of the pre-polymer resin prior to the addition of fumaric acid was performed. The factor levels and response data analyzed is shown in Table 1.

TABLE 1

| Batch ID | Acid Value before FA Added | Catalyst (wt. %) | Second Stage Polym. Temp (° C.) | Single Point Viscosity (poise) | Final Resin Acid Value | Free Fumaric Acid Level (31P NMR) | Haze (50/50 cut in MEK) | Grit Mass from Resin in MEK(g) |
|---|---|---|---|---|---|---|---|---|
| 78 | 3.4 | 0.279 | 210 | 35.8 | 12.7 | 0.8 | 80 | 0.063 |
| 81 | 5.4 | 0.279 | 210 | 36.2 | 13.0 | 1.7 | 300 | 0.08 |
| 84 | 3.4 | 0.074 | 210 | 35.2 | 13.1 | 1.7 | 80 | 0.06 |
| 86 | 5.5 | 0.074 | 210 | 34.4 | 12.8 | 1.5 | 200 | 0.08 |
| 87 | 1.4 | 0.279 | 210 | 36.2 | 12.1 | 0.1 | 5 | 0.19 |
| 88 | 3.5 | 0.279 | 235 | 39.8 | 14.2 | 1.1 | 500 | 0.14 |
| 94 | 0.6 | 0.279 | 210 | 30.4 | 11.6 | 0.6 | 5 | 0.19 |
| 12 | 1.2 | 0.279 | 210 | 36.3 | 12.7 | 0.16 | 350 | 0.1 |
| 32 | 1.0 | 0.279 | 210 | 37.5 | 13.0 | 0.06 | 300 | 0.09 |
| 50 | 1.9 | 0.074 | 210 | 36.4 | 13.4 | 0.65 | 400 | 0.06 |
| 58 | 0.8 | 0.074 | 210 | 37.6 | 13.5 | 1.62 | 250 | 0.09 |
| 62 | 1.0 | 0.074 | 210 | 37.2 | 13.5 | 1.22 | 280 | 0.07 |
| 100 | 1.4 | 0.074 | 210 | 30.5 | 13.6 | 1.52 | 300 | 0.09 |

The properties (responses) measured for each resin were single point viscosity at 200° C., final acid value of the resin, level of free fumaric acid determined by 31P NMR analysis, haziness of the resin and mass of insoluble grit material collected from 20 grams of resin dissolved in methyl ethyl ketone (MEK) solvent. Multiple regression analysis of acid value before fumaric acid addition and catalyst level with respect to the various responses was performed. From the study, the amount of unreacted or free fumaric acid correlated with only the two factors—acid value before fumaric acid addition and catalyst loading. The correlation of these factors with free fumaric acid shows the significance with an adjusted R2 of 0.95 a high Significance F value of 39.

Figure 2:
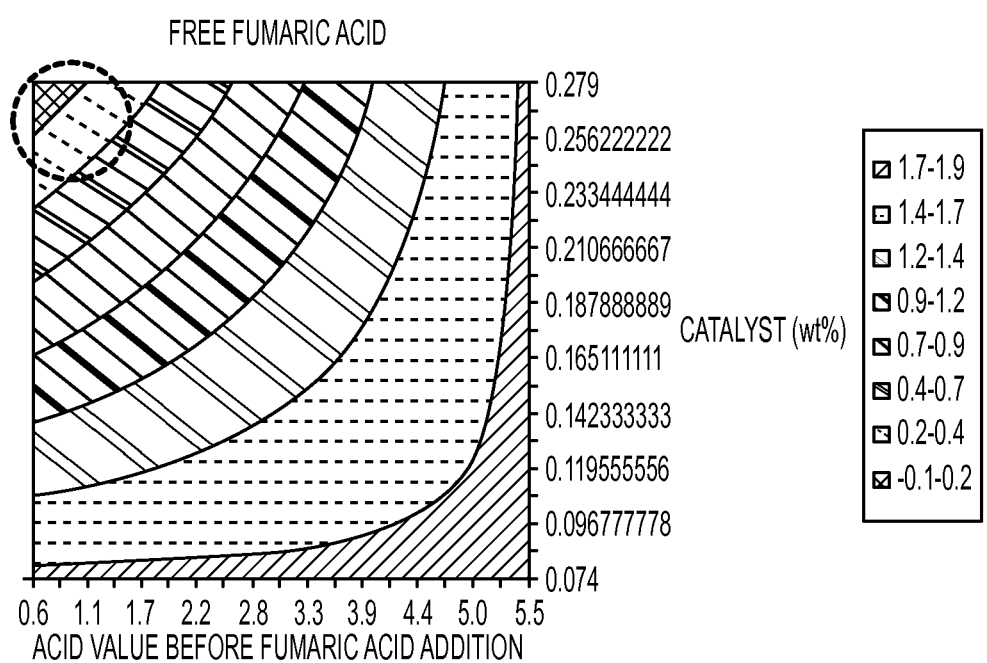
FIG. 2 is a Y-hat contour plot showing the relationship between low levels of free fumaric acid and catalyst loading and acid value of the pre-polymer prior to the addition of fumaric acid.
Figure 3A:
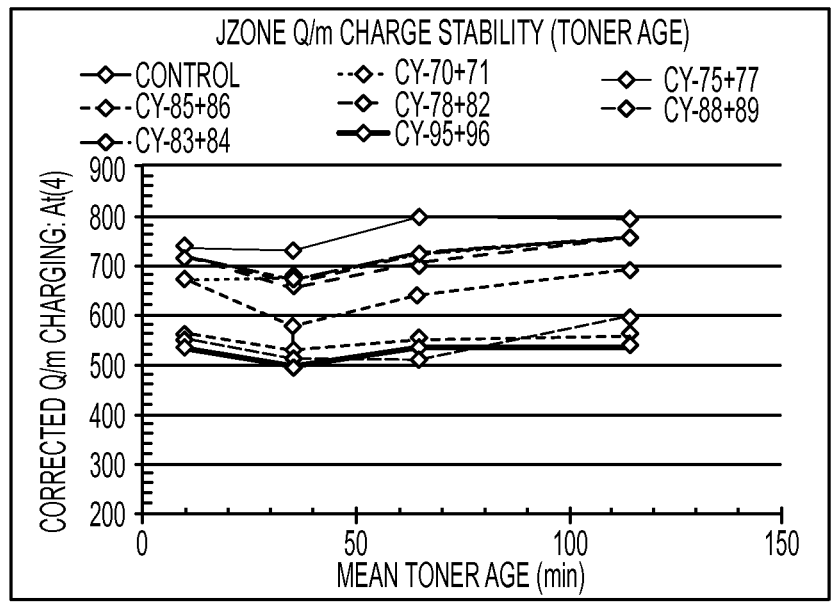
FIGS. 3A-3D are graphs that demonstrate J-zone Q/m, Q/d & Q/m/Q/d charge stability as a function of mean toner age and correlation of qm/qd versus resin free fumaric acid.
Figure 3B:
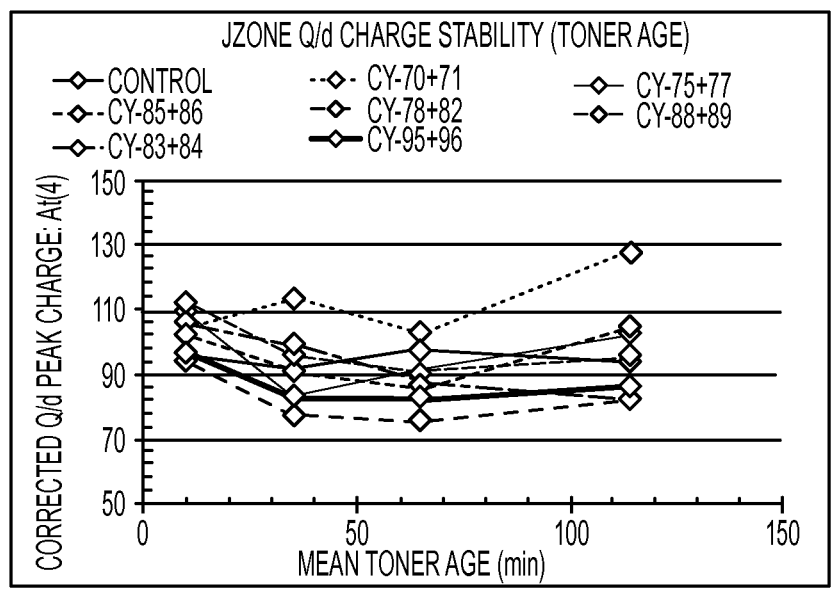
Figure 3C:
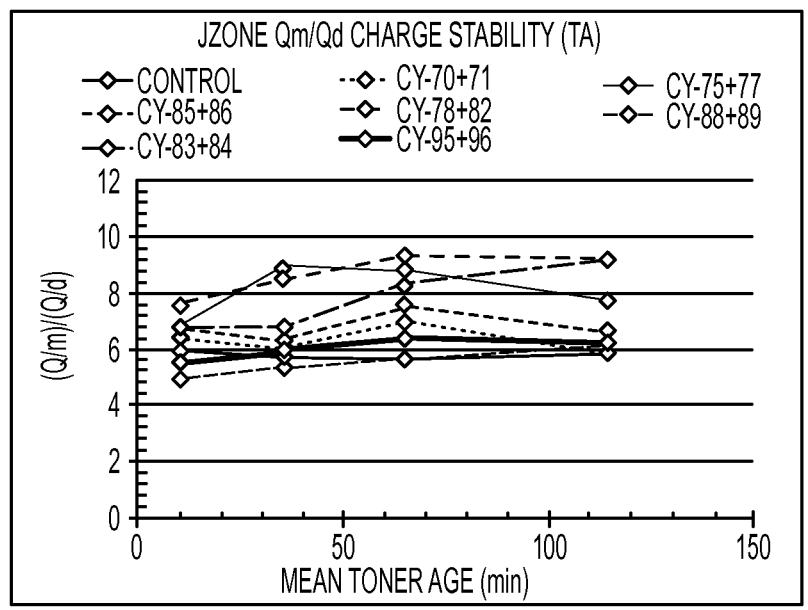
Figure 3D:
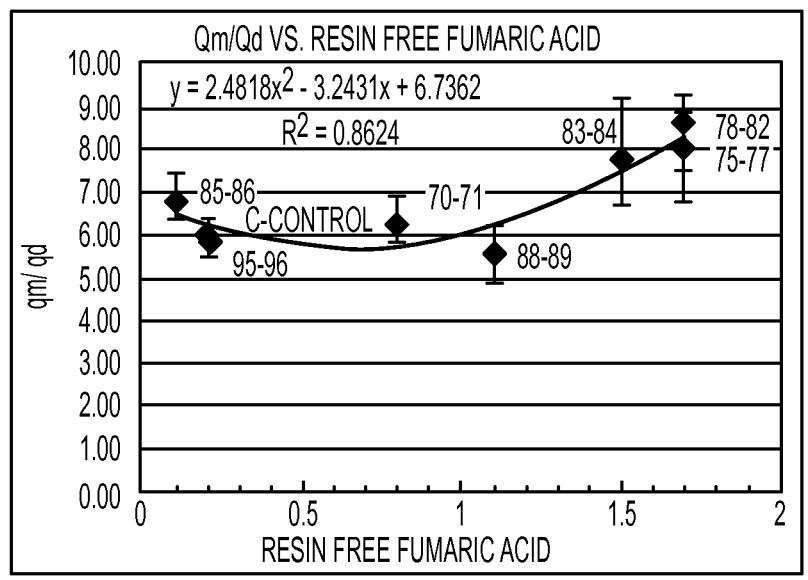

FIG. 2 demonstrates that to achieve a low level of free fumaric acid in the final unsaturated polyester resin, the catalyst amount needs to be high, for example, greater than 0.185 weight percent, or from about 0.190 to about 2.0 weight percent, or from about 0.20 to about 1.0 weight percent, and in a specific embodiment at 0.279 weight percent. Also shown is the fact that the acid value of the pre-polymer before the addition of fumaric acid needs to be very low, for example less than about 1.0 mg KOH/g resin, or from about 0.5 to about 1.0 mg KOH/g resin or less than 0.5 mgKOH/g resin. It is believed that, with more available hydroxyl functional groups for fumaric acid to react with, there is greater incorporation of the reagent.

In view of the above-described experimentation, the present embodiments provide a process for making an unsaturated polyester resin that has significantly reduced and/or low levels of unreacted starting materials. In embodiments, there is provided a process for the preparation of an unsaturated polyester which comprises (i) reacting an organic diol with a cyclic alkylene carbonate in the presence of a first catalyst to thereby form a polyalkoxy diol, (ii) adding thereto a further amount of diacids in the presence of a second catalyst, (iii) monitoring an acid value of the resulting mixture, and (iv) subsequently polycondensing the resulting mixture with an unsaturated diacid.

In embodiments, the organic diol is reacted in an effective amount of, for example, from about 0.95 to about 1.05 mole equivalents with a cyclic alkylene carbonate in an effective amount of, for example, from about 1.95 to about 2.05 mole equivalents, in the presence of a first alkali carbonate catalyst in an effective amount of, for example, from about 0.001 to about 0.1 mole equivalents, to thereby form a polyalkoxy diol, and wherein the polyalkoxy diol is comprised of isomers with, for example, from about 2 to about 5 weight percent of isomer I, from about 95 to about 99 weight percent of isomer II, and from about 0 to about 3 weight percent of isomer III, and the sum of I, II, and III is about 100 percent and wherein said isomers are of the formula as illustrated below:

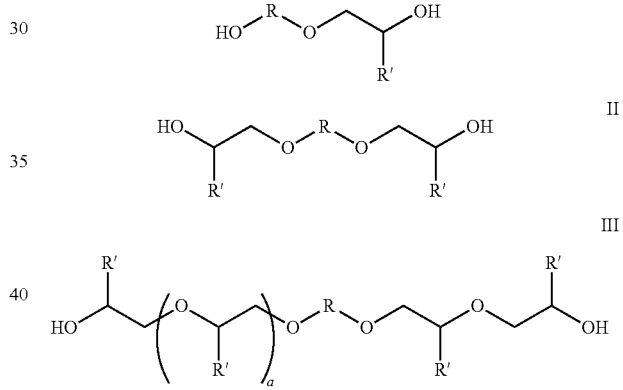

and followed by subsequently polycondensing the resulting polyalkoxy diol with a dicarboxylic acid in an amount of from about 0.95 to about 1.05 mole equivalents, wherein R is an aromatic component, R' is hydrogen or alkyl, and a is zero, 1, or 2, or a mixture of zero, 1, and 2; a process wherein the preparation of an unsaturated polyester comprises (i) reacting an organic diol in an amount of from about 0.95 to about 1.05 mole equivalents with a cyclic alkylene carbonate in an amount of from about 1.95 to about 2.05 mole equivalents, in the presence of a first alkali carbonate catalyst in an amount of from about 0.001 to about 0.1 mole equivalents; adding thereto (ii) from about 0.05 to about 0.45 mole equivalents of cyclic alkylene carbonate in the presence of a second alkali alkoxide catalyst in an amount of from about 0.001 to about 0.1 mole equivalents, to thereby form a polyalkoxy diol comprised of the isomers with from about 0 to about 1 weight percent of isomer IV, from about 85 to about 97 weight percent of isomer V, and from about 3 to about 15 weight percent of isomer VI, and the sum of IV, V, and VI is about 100 percent and wherein said isomers are of the formula as illustrated below:

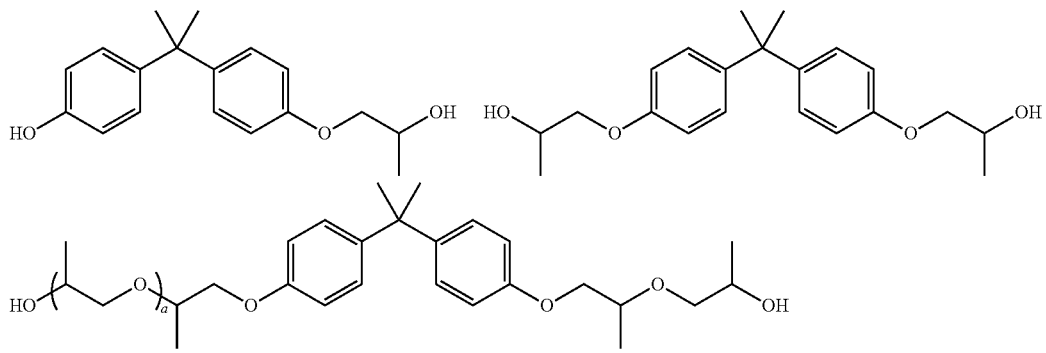

wherein a is as illustrated herein, and followed by subsequently polycondensing the resulting polyalkoxy diol with a dicarboxylic acid in an amount of from about 0.95 to about 1.05 mole equivalents.

Examples of polyesters obtained with the processes of the present invention are poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(propoxylated bisphenol co-maleate), poly(propoxylated bisphenol co-itaconate), poly(1,2-propylene fumarate), poly(propoxylated bisphenol co-maleate), poly(ethoxylated bisphenol co-maleate), poly(butyloxylated bisphenol co-maleate), and poly(co-propoxylated bisphenol co ethoxylated bisphenol co-maleate).

Specific examples of diols selected for the process of the present invention include for example, alkylene diols such as ethane diol, 1,2-propanediol, 1,3-propanediol, 1,3-butanediol, pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, propoxylated bisphenol A, bis-(4-hydroxy phenyl) methane, 1,1-bis-(4-hydroxy phenyl) ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, mixtures thereof and the like inclusive of other known diols; and which diols are employed, for example, in an amount of from about 0.95 mole equivalents to about 1.05 mole equivalents, based on about 1 mole equivalent of dicarboxylic acid utilized.

Dicarboxylic acids examples, especially diacids selected for the process of the present invention include fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azeilic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein the alkyl groups are from about 1 carbon chain to 23 and preferably from about 2 to about 18 carbon chains, and are esters of malonate, succinate, fumarate, itaconate, terephthalate, isophthalate, phthalate, cyclohexanedioate, mixture thereof, and which diacids are employed, for example, in an amount of from about 10 to about 60 percent by weight, and preferably from about 25 to about 50 percent by weight by weight of the reactants. The diacids can be also used with anhydride reagents, such as for example, an anhydride selected from the group consisting of maleic anhydride, trimellitic anhydride, n-dodecenylsuccinic anhydride, 2-dodecenylsuccinic anhydride, 2-undecenylsuccinic anhydride, and combinations thereof.

Examples of cyclic alkylene carbonates selected for the process of the present invention contain from about 3 to about 25 carbon atoms, include ethylene carbonate, 1,2-propylene carbonate, and 1,2-butylene carbonate, mixture thereof and the like, which alkylene carbonates are employed, for example, in an amount of from about 1.95 mole equivalents to about 2.40 mole equivalents, based on about 1 mole equivalent of organic diol utilized.

First catalyst examples selected for the process of the present invention include alkali carbonates such as sodium carbonate, lithium carbonate, potassium carbonate, sodium carbonate, rubidium carbonate, cesium carbonate, beryllium carbonate, magnesium carbonate, calcium carbonate, strontium carbonate, beryllium carbonate, manganese carbonate, barium carbonate and the likes. As stated above, the first catalyst amount needs to be high, for example, greater than 0.01 weight percent, or from about 0.02 to about 2.0 weight percent, or from about 0.05 to about 1.0 weight percent, and in a specific embodiment at 0.1 weight percent of the starting materials. In further embodiments, the first catalyst is used in an amount of from about 0.001 mole percent to about 0.5 mole percent, based on the starting organic diol used, or from about 0.001 mole equivalent to about 0.5 mole equivalent, based on about 1 mole equivalent of organic diol utilized, or further, from about 0.002 mole equivalent to about 0.3 mole equivalent based on 1 mole equivalent of organic diol utilized.

Second catalyst examples selected for the process of the present embodiments include tetraalkyl titanates, dialkyltin oxides such as dibutyltin oxide, tetraalkyltins such as dibutyltin dilaurate, tin esters such as tin-2-ethylhexanoate and tin octanoate and dialkyltin oxide hydroxides such as butyltin oxide hydroxide, aluminum alkoxides, alkyl zinc, dialkyl zinc, zinc oxide, stannous oxide, and mixtures thereof. Such polycondensation catalysts may be utilized for either the crystalline or amorphous polyesters. Such catalysts may be utilized in amounts of, for example, from about 0.01 mole percent to about 5 mole percent based on the starting diacid or diester used to generate the polyester resin.

In such embodiments, reacting an organic diol with a cyclic alkylene carbonate may be performed at a first polymerization temperature of from about 120 to about 250° C., or from about 150 to about 220° C. Polycondensing the resulting mixture with an unsaturated diacid may be performed at a second polymerization temperature of from about 150 to about 300° C., or from about 180 to about 270° C. In these embodiments, reacting an organic diol with a cyclic alkylene carbonate may be further subjected to mixing at a rate of from about 5 to about 600 RPM or from about 10 to about 500 RPM, and polycondensing the resulting mixture with an unsaturated diacid may be further subjected to mixing at a rate of from about 5 to about 600 RPM or from about 10 to about 500 RPM.

In the present embodiments, the unsaturated polyester resin that is produced is clear and has low levels of unreacted starting material, such as the diacid. For example, in present embodiments, the unreacted diacid is present in an amount of less than 1.0, or from about 0.5 to about 1.0, or less than 0.5 as measured by 31P NMR. The toner resin produced surprisingly has substantially reduced amount of unreacted diacid when prepared with the higher catalyst loadings in the first mixture and low acid values of the prepolymer composition. As discussed above, use of such resins to form toner particles provides a resulting toner with less particle fines and improved machine performance. Various known suitable colorants, such as dyes, pigments, and mixtures thereof and present in the toner containing the polyester generated with the processes of the present invention in an effective amount of, for example, from about 1 to about 25 percent by weight of the toner, and preferably in an amount of from about 2 to about 12 weight percent, include carbon black like REGAL 330 magnetites M08029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP604™, NP608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E. I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyans include copper tetra(octadecyl sulfonamido) phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellows are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Various known suitable effective positive or negative charge enhancing additives can be selected for incorporation into the toner compositions of the present invention, preferably in an amount of about 0.1 to about 10, more preferably about 1 to about 3, percent by weight. Examples of the additives include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as BONTRON E84™ or E88™ (Hodogaya Chemical); and the like.

There can also be blended with the toner compositions of the present invention other toner additives, such as external additive particles including flow aid additives, which additives are usually present on the surface thereof. Examples of these additives include metal oxides like titanium oxide, tin oxide, mixtures thereof, and the like, colloidal silicas, such as AEROSIL inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures which are totally incorporated herein by reference. Also, there can be selected as additives the coated silicas of U.S. Pat. No. 6,214,507, which is totally incorporated herein by reference; U.S. Pat. No. 6,004,714, which is totally incorporated herein by reference; and U.S. Pat. No. 6,190,815, which is totally incorporated herein by reference.

Various known crosslinking agents or chemical initiators can be selected for the crosslinking of the prepared unsaturated polyester resins, and which agents are selected in an effective amount of, for example, from about 0.5 to about 5 percent by weight of the toner, and preferably in an amount of from about 1 to about 5 weight percent, such agents including preferably peroxides such as organic peroxides or azo-compounds for the generation of crosslinked toner resins of the invention.

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosure of each of which hereby is incorporated by reference in entirety. In embodiments, toner compositions and toner particles may be prepared by aggregation and coalescence processes in which smaller-sized resin particles are aggregated to the appropriate toner particle size and then coalesced to achieve the final toner particle shape and morphology.

In one embodiment, the process uses Phase Inversion Emulsification (PIE), whereby the phases of a liquid-liquid dispersion interchange such that the dispersed phase spontaneously inverts to become the continuous phase and vice versa under conditions determined by the system properties, volume ratio and energy input. The phase inversion process typically involves the solubilization of a resin and other components in an organic solvent or mixture of organic solvents that include a phase inversion organic solvent, which is typically chosen for its solubility in both organic and aqueous phases. The organic solvents may be selected from the group consisting of methylethylketone (MEK), isopropanol, and mixtures thereof. The standard PIE process generally comprises four steps. The following exemplary description outlines this process for the emulsification of the unsaturated polyester resin into latex:

(1) Dissolution of the resin at a certain temperature in the solvents;

(2) Neutralization of acid groups by adding an aqueous solution of base to the dissolved resin solution after step (1);

(3) Emulsification by adding preheated or room temperature de-ionized water (DIW) to the above mixture; and (4) Removal of the solvents by a vacuum distillation step. The standard emulsion-aggregation steps may be used thereafter to form the toner.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in, for example, U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional wax, an optional coagulant, and any other desired or required additives, and emulsions including the resins, gellants, and colorants as described above, optionally in surfactants as described above, and then coalescing the aggregate mixture. A mixture may be prepared by adding an optional colorant and optionally a wax or other materials, which may also be optionally in a dispersion(s) including a surfactant, to the emulsion, which may be a mixture of two or more emulsions containing the resin(s) and gellants. For example, emulsion/aggregation/coalescing processes for the preparation of toners are illustrated in the disclosure of the patents and publications referenced hereinabove.

The pH of the resulting mixture may be adjusted by an acid such as, for example, acetic acid, sulfuric acid, hydrochloric acid, citric acid, trifluoro acetic acid, succinic acid, salicylic acid, nitric acid or the like. In embodiments, the pH of the mixture may be adjusted to from about 2 to about 5. In embodiments, the pH is adjusted utilizing an acid in a diluted form of from about 0.5 to about 10 weight percent by weight of water, in other embodiments, of from about 0.7 to about 5 weight percent by weight of water.

Examples of bases used to increase the pH and ionize the aggregate particles, thereby providing stability and preventing the aggregates from growing in size, may include sodium hydroxide, potassium hydroxide, ammonium hydroxide, cesium hydroxide and the like, among others.

Additionally, in embodiments, the mixture may be homogenized. If the mixture is homogenized, homogenization may be accomplished by mixing at a speed of from about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C.sub.12, C.sub.15, C.sub.17 trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like.

Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0.1 to about 10 weight percent, in embodiments from about 0.2 to about 8 weight percent, in other embodiments from about 0.5 to about 5 weight percent, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C. and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example from about 40° C. to about 90° C. in embodiments from about 45° C. to about 80° C. which may be below the glass transition temperature of the resin(s) utilized to form the toner particles.

Once the desired final size of the toner particles is achieved, the pH of the mixture may be adjusted with a base to a value from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

Shell Resin

In embodiments, after aggregation, but prior to coalescence, a shell may be applied to the aggregated particles. Any resin described above as suitable for forming the core resin may be utilized as the shell. In embodiments, an amorphous polyester resin and/or a bio-based amorphous resin as described above may be included in the shell.

In embodiments, an amorphous resin which may be utilized to form a shell includes an amorphous polyamide, optionally in combination with an additional polyester resin latex. Multiple resins may thus be utilized in any suitable amounts. In embodiments, a first bio-based amorphous resin may be present in an amount of from about 20 percent by weight to about 100 percent by weight of the total shell resin, in embodiments from about 30 percent by weight to about 90 percent by weight of the total shell resin. Thus, in embodiments, a second amorphous resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art. In embodiments, the resins utilized to form the shell may be in an emulsion including any surfactant described above. The emulsion possessing the resins may be combined with the aggregated particles described above so that the shell forms over the aggregated particles.

The formation of the shell over the aggregated particles may occur while heating to a temperature of from about 30° C. to about 80° C. in embodiments from about 35° C. to about 70° C. The formation of the shell may take place for a period of time of from about 5 minutes to about 10 hours, in embodiments from about 10 minutes to about 5 hours.

Coalescence

Following aggregation to the desired particle size and application of any optional shell, the particles may then be coalesced to the desired final shape, the coalescence being achieved by, for example, heating the mixture to a temperature from about 45° C. to about 100° C. in embodiments from about 55° C. to about 99° C. which may be at or above the glass transition temperature of the resins utilized to form the toner particles, and/or reducing the stirring, for example to from about 100 revolutions per minute (rpm) to about 1,000 rpm, in embodiments from about 200 rpm to about 800 rpm. The fused particles may be measured for shape factor or circularity, such as with a Sysmex FPIA 2100 analyzer, until the desired shape is achieved.

Coalescence may be accomplished over a period from about 0.01 hours to about 5 hours, in embodiments from about 1 hour to about 3 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents may be applied simultaneously with the shell resin described above or after application of the shell resin.

There may also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, triboelectric charge enhancement, admix control, improved development and transfer stability, and higher toner blocking temperature. $TiO_2$ may be applied for improved relative humidity (RH) stability, triboelectric charge control and improved development and transfer stability. Zinc stearate, calcium stearate and/or magnesium stearate may optionally also be used as an external additive for providing lubricating properties, developer conductivity, triboelectric charge enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount from about 0.1 weight percent to about 5 weight percent of the toner, in embodiments from about 0.25 weight percent to about 3 weight percent of the toner. In embodiments, the toners may include, for example, from about 0.1 weight percent to about 5 weight percent titania, from about 0.1 weight percent to about 8 weight percent silica, and from about 0.1 weight percent to about 4 weight percent zinc stearate.

Suitable additives include those disclosed in U.S. Pat. Nos. 3,590,000, and 6,214,507, the disclosures of each of which are hereby incorporated by reference in their entirety. Again, these additives may be applied simultaneously with the shell resin described above or after application of the shell resin.

Toners may possess favorable charging characteristics when exposed to extreme RH conditions. The low humidity zone (J zone) may be about 21° C./10% RH, while the high humidity zone (A zone) may be about 28° C./85% RH. Toners of the disclosure may possess a parent toner charge per mass ratio (Q/M) of from about −5 µC/g to about −80 µC/g, in embodiments, from about −10 µC/g to about −70 µC/g, and a final toner charging after surface additive blending of from −15 µC/g to about −60 µC/g, in embodiments, from about −20 µC/g to about −55 µC/g.

The toner particles thus formed may be formulated into a developer composition. The toner particles may be mixed with carrier particles to achieve a two component developer composition. The toner concentration in the developer may be from about 1% to about 25% by weight of the total weight of the developer, in embodiments, from about 2% to about 15% by weight of the total weight of the developer.

The toners can be utilized for electrophotographic processes, including those disclosed in U.S. Pat. No. 4,295,990, the disclosure of which is hereby incorporated by reference in entirety. In embodiments, any known type of image development system may be used in an image developing device, including, for example, magnetic brush development, hybrid scavengeless development (HSD), semiconductive magnetic brush (SCMB) and the like. Those and similar development systems are within the purview of those skilled in the art.

It is envisioned that the toners of the present disclosure may be used in any suitable procedure for forming an image with a toner, including in applications other than xerographic applications.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Resin Synthesis

The process to synthesize the unsaturated polyester resin has been modified to reduce the amount of unreacted fumaric acid identified in earlier batches of resin prepared at XRCC in the lab and pilot plant. The present embodiments provide key parameters to achieve low levels of unreacted fumaric acid in the resin and result in an optimized process that was implemented in the synthesis of resin batch 97, which is a repeat of resin batch 87.

Comparative Resin Example #1

Into a 5 gallon stainless steel reactor equipped with a P4 pitched blade agitator, a take-off condenser, a condensate collecting vessel, vacuum pump and hot oil temperature control system was added propoxylated bisphenol A (9.77 kg), terephthalic acid (2.29 kg) and butyl stannoic acid catalyst (Fascat 4100) (11.0 g) and dodecenylsuccinic anhydride (DDSA) (1.51 kg). The reactor is heated to 230° C. by setting the hot oil temperature for the reactor to 235° C. under $N_2$ gas purge (5 scfh) and mixing at 300 rpm. During the esterification portion of the reaction water is collected in the collecting vessel and the mass of water produced is monitored. The theoretical mass of water expected to come off is approximately 694 grams. After the expected amount of water is collected the reactor is cooled down to <190° C. and purged with nitrogen. Fumaric acid (1.235 kg) and hydroquinone (22.8 g) is added into the reactor and heated up to 190° C. by setting the hot oil temperature to 200° C., applying a $N_2$ gas purge (15 schf) and mixing at 300 rpm. Over a 2 hour period the vacuum is reduced from atmospheric to <20 mm Hg. Resin samples are taken throughout the reaction to monitor viscosity, softening point (Ts) and acid value. The endpoint of the polycondensation reaction is achieved when the resin viscosity is between 32-42 poise at 200° C. and acid value is between 10.5 to 12.5 mgKOH/g resin. The hot polymer melt is discharged into 4 metal pails and allowed to cool and solidify overnight. The theoretical yield of resin is 13.6 kg. Final properties of the resin are acid value=11.24 mg KOH/g resin, softening temperature (Shimadzu) (T1/2)=107.0° C. and single point viscosity=35.2 poise at 200° C. The amount of unreacted fumaric acid determined by 31P NMR by reacting the polymer chain ends with chloro-phospholane is 2.2

Resin Example 1

Unsaturated Polyester Resin Batch 78

Into a 5 liter electrically heated glass reactor equipped with a mixing blade, temperature probe, column for vacuum source and $N_2$ purging source with sample port was added propoxylated bisphenol A (2806.656 g, 65.53 weight percent), terephthalic acid (687.55 g, 16.053 weight percent) and butyl stannoic acid catalyst (Fascat 4100) (11.971 g, 0.279 weight percent) and dodecenylsuccinic anhydride (DDSA) (433.996 g, 10.133 weight percent). The reactor was set to sparge $N_2$ gas at 180 scfh and mixed at 150 rpm and then heated to 235° C. During the esterification portion of the reaction water is collected and the mass of water produced is monitored. The resin acid value is monitor and once the target acid value of 3 mgKOH/g resin is reached the reaction is cooled to 170° C. At 170° C. fumaric acid (334.273 g, 7.805 weight percent) and hydroquinone (8.552 g, 0.2 weight percent) are added into the reactor and heated up to 210° C. Once 210° C. was reached vacuum distillation was applied slowly to 25 mmHg. As the reaction proceeded samples are taken hourly to monitor acid value. When the acid value reached <16 mgKOH/g resin then samples are taken every 15 minutes until the target acid value is reached between 12-14 mgKOH/g resin with a single point resin viscosity at 200° C. of 32 to 40 poise. The yield of resin produced was 4.283 kg with an acid value of 12.7 mgKOH/g resin and single point viscosity of 35.8 poise measured at 200° C. The mass of distillate collected was 4 kg. The amount of unreacted fumaric acid determined by 31P NMR by reacting the polymer chain ends with chloro-phospholane was 0.8.

Resin Example 2

Unsaturated Polyester Resin Batch 84

Into a 5 liter electrically heated glass reactor equipped with a mixing blade, temperature probe, column for vacuum source and $N_2$ purging source with sample port was added propoxylated bisphenol A (2813.086 g, 65.665 weight percent), terephthalic acid (689.128 g, 16.086 weight percent) and butyl stannoic acid catalyst (Fascat 4100) (3.186 g, 0.074 weight percent) and dodecenylsuccinic anhydride (DDSA) (434.990 g, 10.154 weight percent). The reactor was set to sparge $N_2$ gas at 180 scfh and mixed at 150 rpm and then heated to 235° C. During the esterification portion of the reaction water is collected and the mass of water produced is monitored. The resin acid value is monitor and once the target acid value of 3 mgKOH/g resin is reached the reaction is cooled to 170° C. At 170° C. fumaric acid (335.039 g, 7.821 weight percent) and hydroquinone (8.571 g, 0.2 weight percent) are added into the reactor and heated up to 210° C. Once 210° C. was reached vacuum distillation was applied slowly to 25 mmHg. As the reaction proceeded samples are taken hourly to monitor acid value. When the acid value reached <16 mgKOH/g resin then samples are taken every 15 minutes until the target acid value is reached between 12-14 mgKOH/g resin with a single point resin viscosity at 200° C. of 32 to 40 poise. The yield of resin produced was 4.284 kg with an acid value of 13.1 mgKOH/g resin and single point viscosity of 35.2 poise measured at 200° C. The mass of distillate collected was 4 kg. The amount of unreacted fumaric acid determined by 31P NMR by reacting the polymer chain ends with chloro-phospholane was 1.7.

Resin Example 3

Unsaturated Polyester Resin Batch 87

Into a 5 liter electrically heated glass reactor equipped with a mixing blade, temperature probe, column for vacuum source and $N_2$ purging source with sample port was added propoxylated bisphenol A (2806.656 g, 65.53 weight percent), terephthalic acid (687.553 g, 16.053 weight percent) and butyl stannoic acid catalyst (Fascat 4100) (11.971 g, 0.279 weight percent) and dodecenylsuccinic anhydride (DDSA) (433.996 g, 10.133 weight percent). The reactor was set to sparge $N_2$ gas at 180 scfh and mixed at 150 rpm and then heated to 235° C. During the esterification portion of the reaction water is collected and the mass of water produced is monitored. The resin acid value is monitor and once the target acid value of less than 1.5 mgKOH/g resin is reached the reaction is cooled to 170° C. At 170° C. fumaric acid (334.273 g, 7.805 weight percent) and hydroquinone (8.552 g, 0.2 weight percent) are added into the reactor and heated up to 210° C. Once 210° C. was reached vacuum distillation was applied slowly to 25 mmHg. As the reaction proceeds samples are taken hourly to monitor acid value. When the acid value reaches <16 mgKOH/g resin then samples are taken every 15 minutes until the target acid value is reached between 12-14 mgKOH/g resin with a single point resin viscosity at 200° C. of 32 to 40 poise. The yield of resin produced was 4.283 kg with an acid value of 12.1 mgKOH/g resin and single point viscosity of 36.2 poise measured at 200° C. The mass of distillate collected was 4 kg. The amount of unreacted fumaric acid determined by 31P NMR by reacting the polymer chain ends with chloro-phospholane was 0.1.

Resin Example 4

Unsaturated Polyester Resin Batch 97; Repeat of 87

Into a 5 liter electrically heated glass reactor equipped with a mixing blade, temperature probe, column for vacuum source and $N_2$ purging source with sample port was added propoxylated bisphenol A (1507.19 g, 65.53 weight percent), terephthalic acid (369.22 g, 16.053 weight percent) and butyl stannoic acid catalyst (Fascat 4100) (6.430 g, 0.279 weight percent) and dodecenylsuccinic anhydride (DDSA) (233.06 g, 10.133 weight percent). The reactor was set to sparge $N_2$ gas at 180 scfh and mixed at 150 rpm and then heated to 235° C. During the esterification portion of the reaction water is collected and the mass of water produced is monitored. The resin acid value is monitor and once the target acid value of less than 1.5 mgKOH/g resin is reached the reaction is cooled to 170° C. At 170° C. fumaric acid (171.023 g, 7.805 weight percent) and hydroquinone (4.38 g, 0.2 weight percent) are added into the reactor and heated up to 210° C. Once 210° C. is reached vacuum distillation is applied slowly to 25 mmHg. As the reaction proceeds samples are taken hourly to monitor acid value. When the acid value reaches <16 mgKOH/g resin then samples are taken every 15 minutes until the target acid value is reached between 12-14 mgKOH/g resin with a single point resin viscosity at 200° C. of 32 to 40 poise. The yield of resin produced was 2.191 kg with an acid value of 11.9 mg KOH/g resin and single point viscosity of 35.0 poise measured at 200° C. The amount of unreacted fumaric acid determined by 31P NMR by reacting the polymer chain ends with chloro-phospholane was 0.2.

Toner Synthesis

Two particle batches made from the same batch of the unsaturated polyester resin were combined and surface additives were blended onto the particles to form toners which were then evaluated in the Xerox 700 machine for J-zone stress aging performance. Preparation of each toner particle batch is provided in this section along with two toner comparative examples (cyan)—a control cyan emulsion aggregation toner and the production toner particle batch control toner CY-78 using an earlier batch of the unsaturated polyester resin dispersion with an unacceptable level of residual fumaric acid in the resin that illustrates the shortfall. Table 2 provides the particle properties for the various laboratory batches of toner particles made with prepared the unsaturated polyester resins having different level of free fumaric acid.

dioxide, 1.73 weight percent X24 and 0.18 weight percent zinc stearate producing the toner for Xerox 700 machine evaluation.

TABLE 2

| Resin batch No. | ID of toners | Theoretic at Yield (g) | Particle Size (d50) μm | GSDv | GSDn | Fines % (1.3-3.0 um) | Circularity | Coarse (%) | Yield (%) | Free Fumaric Acid |
|---|---|---|---|---|---|---|---|---|---|---|
| 78 | CY-70 | 200 | 6.02 | 1.25 | 1.27 | 2.85 | 0.964 | 8.75 | 85.97 | 0.8 |
|    | CY-71 | 170 | 5.89 | 1.25 | 1.25 | 3.65 | 0.962 | 7.1 | 86.24 |   |
| 81 | CY-75 | 170 | 5.77 | 1.23 | 1.23 | 3.63 | 0.961 | 5.74 | 88.97 | 1.7 |
|    | CY-77 | 200 | 5.89 | 1.24 | 1.24 | 0.38 | 0.963 | 3.07 | 91.13 |   |
| 84 | CY-78 | 170 | 5.42 | 1.22 | 1.25 | 4.07 | 0.959 | ND | 83.0 | 1.7 |
|    | CY-82 | 170 | 5.89 | 1.23 | 1.22 | 0.77 | 0.954 | 4.2 | 91.46 |   |
| 86 | CY-83 | 170 | 5.71 | 1.21 | 1.23 | 4.71 | 0.960 | 24.2 | 78.11 | 1.5 |
|    | CY-84 | 170 | 5.65 | 1.22 | 1.22 | 1.61 | 0.965 | 14.9 | 79.74 |   |
| 87 | CY-85 | 170 | 5.83 | 1.22 | 1.23 | 2.94 | 0.962 | 8.1 | 87.73 | 0.1 |
|    | CY-86 | 170 | 5.89 | 1.25 | 1.25 | 3.65 | 0.957 | 13.87 | 81.6 |   |
| 88 | CY-88 | 170 | 6.14 | 1.22 | 1.23 | 3.32 | 0.958 | 8.31 | 82.38 | 1.1 |
|    | CY-89 | 170 | 6.27 | 1.23 | 1.23 | 1.44 | 0.961 | 5.97 | 88.33 |   |
| 97 | CY-95 | 170 | 6.14 | 1.22 | 1.25 | 3.62 | 0.977 | 6 | 88.97 | 0.2 |
|    | CY-96 | 170 | 6.41 | 1.22 | 1.25 | 1.44 | 0.959 | 9.07 | 85.20 |   |

Two control cyan toners are used as comparative examples for this study. A commercially available cyan low melt toner (Comparative example 1) and a poor performing variant of comparative example 1 that contains the unsaturated polyester resin dispersion with high amount of free fumaric acid (Comparative example 2). The other toners were prepared from various batches of the unsaturated polyester resin with different amounts of free fumaric acid (as described in Examples 1-7).

Comparative Example 1

Into a 20 gallon reactor was added 8.125 kg of high molecular amorphous resin (35 weight percent) prepared by standard phase inversion emulsification process with 8.125 kg of low molecular amorphous resin (35 weight percent) prepared by standard phase inversion emulsification process, 2.561 kg of crystalline resin emulsion (35 weight percent), 3.440 kg polymethylene wax dispersion (30 weight percent) and 3.977 kg cyan pigment PB15:3 (16.7 weight percent). Separately 197 grams of $Al_2(SO_4)_2$ (27.85 weight percent) was added in as the flocculent under homogenization. The particle size was monitored with a Coulter Counter until the core particles reached a volume average particle size of 4.9 μm with a GSD volume of 1.21 and then 4.491 kg of above mentioned high and low molecular amorphous resins was added as shell material, resulting in a core-shell structured particles with an average particle size of 5.65 microns, GSD volume 1.18. Thereafter, the pH of the reaction slurry was then increased to 7.8 using 4 weight percent NaOH solution followed by 423 grams of ethylenediaminetetraacetic acid (EDTA) (39 weight percent) to freeze the toner growth. After freezing, the reaction mixture was then heated to 85° C. while maintaining the pH at 7.8. After a slight reduction in pH the particles were quenched after coalescence, resulting in a final particle size of 5.79 microns, GSD volume of 1.19, GSD number 1.21, the fines population (1.4-3.17 microns) of 2.01 percent and a circularity of 0.974.

The toner particle slurry was then cooled to room temperature, separated by sieving (20 μm), filtration, followed by washing and drying. This batch was then blended with the following surface additives: 0.28 weight percent cerium oxide, 0.5 weight percent poly(methyl methacrylate) (PMMA), 0.86 weight percent RX50 silica, 1.29 weight percent RY50L silica, 0.88 weight percent STT100H titanium dioxide, 1.73 weight percent X24 and 0.18 weight percent zinc stearate producing the toner for Xerox 700 machine evaluation.

Comparative Example 2

Into a 20 gallon reactor was added 8.125 kg of high molecular amorphous resin (35 weight percent) prepared by standard phase inversion emulsification process with 6.32 kg of the unsaturated polyester resin (45 weight percent) prepared by standard phase inversion emulsification process, 2.196 kg of crystalline resin emulsion (35 weight percent), 3.440 kg polymethylene wax dispersion (30 weight percent) and 3.977 kg cyan pigment PB15:3 (16.7 weight percent). Separately 197 grams of $Al_2(SO_4)_2$ (27.85 weight percent) was added in as the flocculent under homogenization. The particle size was monitored with a Coulter Counter until the core particles reached a volume average particle size of 4.9 μm with a GSD volume of 1.20 and then 4.491 kg of above mentioned high and 3.493 kg low molecular amorphous resins was added as shell material, resulting in a core-shell structured particles with an average particle size of 5.65 microns, GSD volume 1.24. Thereafter, the pH of the reaction slurry was then increased to 7.8 using 4 weight percent NaOH solution followed by 423 grams of EDTA (39 weight percent) to freeze the toner growth. After freezing, the reaction mixture was then heated to 85° C. while maintaining the pH at 7.8. After a slight reduction in pH the particles were quenched after coalescence, resulting in a final particle size of 5.63 microns, GSD volume of 1.23, GSD number 1.34, the fines population (1.4-3.17 microns) of 10.87 percent and a circularity of 0.973.

The toner slurry was then cooled to room temperature, separated by sieving (20 μm), filtration, followed by washing and drying. This batch was then blended with the following surface additives: 0.28 weight percent cerium oxide, 0.5 weight percent PMMA, 0.86 weight percent RX50 silica, 1.29 weight percent RY50L silica, 0.88 weight percent STT100H titanium dioxide, 1.73 weight percent X24 and 0.18 weight percent zinc stearate producing the toner for Xerox 700 machine evaluation.

Example 1

EA Toner CY-70+71

Into a 2 liter glass reactor equipped with an overhead mixer was added 146.24 g emulsion of high molecular amorphous resin A (35.38 weight percent) prepared by standard phase inversion emulsification process, 282.92 g emulsion of the unsaturated polyester resin (78) (17.93 weight percent) prepared by standard phase inversion emulsification process, 38.88 g crystalline resin emulsion (35.70 weight percent), 61.71 g polymethylene wax dispersion (29.90 weight percent) and 72.18 g cyan pigment PB15:3 (16.61 weight percent). Separately 3.59 g $Al_2(SO_4)_3$ (27.85 weight percent) was added in as the flocculent under homogenization. The mixture was heated to 42.6° C. to aggregate the particles while stirring at 200 rpm. The particle size was monitored with a Coulter Counter until the core particles reached a volume average particle size of 4.17 μm with a GSD volume of 1.24, and then 85.76 g of above mentioned high molecular amorphous resin A emulsion and 156.25 g of the unsaturated polyester resin (lot No. 4798-78) emulsion mixture were added as shell material, resulting in a core-shell structured particles with an average particle size of 5.77 microns, GSD volume 1.25. Thereafter, the pH of the reaction slurry was then increased to 7.8 using 4 weight percent NaOH solution followed by 7.69 g EDTA (39 weight percent) to freeze the toner growth. After freezing, the reaction mixture was heated to 85° C., while maintaining the pH at 7.8. Then reduce the pH to 7.19. This toner CY-70 was quenched after coalescence, resulting in a final particle size of 6.02 microns, GSD volume of 1.25, GSD number 1.27, the fines population (1.3-3.0 microns) of 2.85 percent and circularity of 0.964.

The toner slurry was then cooled to room temperature, separated by sieving (25 μm), filtration, followed by washing and freeze dried. A duplicate cyan particle batch CY-71 using the same procedure above resulting in final particle size of 5.89 microns, GSD volume of 1.25, GSD number of 1.25, the final population (1.3-3.0 microns) of 3.65 percent and circularity of 0.962. These two particle batches were combined together and then blended with the following surface additives 0.28 weight percent cerium oxide, 0.5 weight percent PMMA, 0.86 weight percent RX50 silica, 1.29 weight percent RY50L silica, 0.88 weight percent STT100H titanium dioxide, 1.73 weight percent X24 and 0.18 weight percent zinc stearate producing the combined toner CY-70/71 for Xerox 700 machine evaluation.

Example 2

EA Toner CY-75+77

Into a 2 liter glass reactor equipped with an overhead mixer was added 144.57 g emulsion of high molecular amorphous resin A (35.79 weight percent) prepared by standard phase inversion emulsification process, 296.31 g emulsion of the unsaturated polyester resin (81) (17.12 weight percent) prepared by standard phase inversion emulsification process, 39.55 g crystalline resin emulsion (35.09 weight percent), 61.77 g polymethylene wax dispersion (29.87 weight percent) and 72.18 g cyan pigment PB15:3 (16.61 weight percent). Separately 3.59 g $Al_2(SO_4)_3$ (27.85 weight percent) was added in as the flocculent under homogenization. The mixture was heated to 45.3° C. to aggregate the particles while stirring at 200 rpm. The particle size was monitored with a Coulter Counter until the core particles reached a volume average particle size of 4.30 μm with a GSD volume of 1.23, and then 79.84 g of above mentioned high molecular amorphous resin A emulsion and 163.64 g of the unsaturated polyester resin (lot No. 4798-81) emulsion mixture were added as shell material, resulting in a core-shell structured particles with an average particle size of 5.59 microns, GSD volume 1.21. Thereafter, the pH of the reaction slurry was then increased to 7.8 using 4 weight percent NaOH solution followed by 7.69 g EDTA (39 weight percent) to freeze the toner growth. After freezing, the reaction mixture was heated to 85° C., while maintaining the pH at 7.8. Then reduce the pH to 7.08. This toner CY-75 was quenched after coalescence, resulting in a final particle size of 5.77 microns, GSD volume of 1.23, GSD number 1.23, the fines population (1.3-3.0 μm) of 3.63 percent and circularity 0.961.

The toner slurry was then cooled to room temperature, separated by sieving (25 μm), filtration, followed by washing and freeze dried. A duplicate cyan particle batch CY-77 using the same procedure above resulting in final particle size of 5.89 microns, GSD volume of 1.24, GSD number of 1.24, the final population (1.3-3.0 microns) of 0.38 percent and circularity of 0.963. These two particle batches were combined together and then blended with the following surface additives 0.28 weight percent cerium oxide, 0.5 weight percent PMMA, 0.86 weight percent RX50 silica, 1.29 weight percent RY50L silica, 0.88 weight percent STT100H titanium dioxide, 1.73 weight percent X24 and 0.18 weight percent zinc stearate producing the combined toner CY-75/77 for Xerox 700 machine evaluation.

Example 3

EA Toner CY-78+82

Into a 2 liter glass reactor equipped with an overhead mixer was added 124.62 g emulsion of high molecular amorphous resin A (35.29 weight percent) prepared by standard phase inversion emulsification process, 204.06 g emulsion of the unsaturated polyester resin (84) (21.13 weight percent) prepared by standard phase inversion emulsification process, 33.62 g crystalline resin emulsion (35.09 weight percent), 52.50 g polymethylene wax dispersion (29.87 weight percent) and 56.21 g cyan pigment PB15:3 (18.13 weight percent). Separately 3.05 g $Al_2(SO_4)_3$ (27.85 weight percent) was added in as the flocculent under homogenization. The mixture was heated to 42.8° C. to aggregate the particles while stirring at 200 rpm. The particle size was monitored with a Coulter Counter until the core particles reached a volume average particle size of 4.58 μm with a GSD volume of 1.21, and then 68.82 g of above mentioned high molecular amorphous resin A emulsion and 112.69 g the unsaturated polyester resin (84) emulsion mixture were added as shell material, resulting in a core-shell structured particles with an average particle size of 5.65 microns, GSD volume 1.21. Thereafter, the pH of the reaction slurry was then increased to 7.8 using 4 weight percent NaOH solution followed by 6.54 g EDTA (39 weight percent) to freeze the toner growth. After freezing, the reaction mixture was heated to 85° C., while maintaining the pH at 7.8. Then reduce the pH to 7.13. This toner CY-78 was quenched after coalescence, resulting in a final particle size of 5.42 microns, GSD volume of 1.22, GSD number 1.25, the fines population (1.3-3.0 μm) of 4.07 percent and circularity 0.959.

The toner slurry was then cooled to room temperature, separated by sieving (25 μm), filtration, followed by washing and freeze dried. A duplicate cyan particle batch CY-82 using the same procedure above resulting in final particle size of 5.89 microns, GSD volume of 1.23, GSD number of 1.23, the final population (1.3-3.0 microns) of 0.77 percent and circularity of 0.954. These two particle batches were combined together and then blended with the following surface additives 0.28 weight percent cerium oxide, 0.5 weight percent PMMA, 0.86 weight percent RX50 silica, 1.29 weight percent RY50L silica, 0.88 weight percent STT100H titanium dioxide, 1.73 weight percent X24 and 0.18 weight percent zinc stearate producing the combined toner CY-78/82 for Xerox 700 machine evaluation.

Example 4

EA Toner CY-83+84

Into a 2 liter glass reactor equipped with an overhead mixer was added 124.73 g emulsion of high molecular amorphous resin A (35.26 weight percent) prepared by standard phase inversion emulsification process, 196.98 g emulsion of the unsaturated polyester resin (86) (21.89 weight percent) prepared by standard phase inversion emulsification process, 33.62 g crystalline resin emulsion (35.09 weight percent), 52.50 g polymethylene wax dispersion (29.87 weight percent) and 56.21 g cyan pigment PB15:3 (18.13 wt %). Separately 3.05 g $Al_2(SO_4)_3$ (27.85 weight percent) was added in as the flocculent under homogenization. The mixture was heated to 44.9° C. to aggregate the particles while stirring at 200 rpm. The particle size was monitored with a Coulter Counter until the core particles reached a volume average particle size of 4.73 μm with a GSD volume of 1.25, and then 68.88 g of above mentioned high molecular amorphous resin A emulsion and 108.78 g the unsaturated polyester resin (86) emulsion mixture were added as shell material, resulting in a core-shell structured particles with an average particle size of 5.65 microns, GSD volume 1.20. Thereafter, the pH of the reaction slurry was then increased to 7.8 using 4 weight percent NaOH solution followed by 6.54 g EDTA (39 weight percent) to freeze the toner growth. After freezing, the reaction mixture was heated to 85° C., while maintaining the pH at 7.8. Then reduce the pH to 7.25. This toner CY-83 was quenched after coalescence, resulting in a final particle size of 5.71 microns, GSD volume of 1.21, GSD number 1.23, the fines population (1.3-3.0 μm) of 4.71 percent and circularity 0.960.

The toner slurry was then cooled to room temperature, separated by sieving (25 μm), filtration, followed by washing and freeze dried. A duplicate cyan particle batch CY-84 using the same procedure above resulting in final particle size of 5.65 microns, GSD volume of 1.22, GSD number of 1.22, the final population (1.3-3.0 microns) of 1.61 percent and circularity of 0.965. These two particle batches were combined together and then blended with the following surface additives 0.28 weight percent cerium oxide, 0.5 weight percent PMMA, 0.86 weight percent RX50 silica, 1.29 weight percent RY50L silica, 0.88 weight percent STT100H titanium dioxide, 1.73 weight percent X24 and 0.18 weight percent zinc stearate producing the combined toner CY-83/84 for Xerox 700 machine evaluation.

Example 5

EA Toner CY-85+86

Into a 2 liter glass reactor equipped with an overhead mixer was added 132.07 g emulsion of high molecular amorphous resin A (35.26 weight percent) prepared by standard phase inversion emulsification process, 264.97 g emulsion of the unsaturated polyester resin (87) (17.23 weight percent) prepared by standard phase inversion emulsification (PIE) process, 35.59 g crystalline resin emulsion (35.09 weight percent), 54.89 g polymethylene wax dispersion (30.25 weight percent) and 59.52 g cyan pigment PB15:3 (18.13 weight). Separately 3.23 g $Al_2(SO_4)_3$ (27.85 weight percent) was added in as the flocculent under homogenization. The mixture was heated to 48.2° C. to aggregate the particles while stirring at 200 rpm. The particle size was monitored with a Coulter Counter until the core particles reached a volume average particle size of 4.58 μm with a GSD volume of 1.24, and then 72.94 g of above mentioned high molecular amorphous resin A emulsion and 146.34 g the unsaturated polyester resin (lot No. 4798-87) emulsion mixture were added as shell material, resulting in a core-shell structured particles with an average particle size of 5.71 microns, GSD volume 1.21. Thereafter, the pH of the reaction slurry was then increased to 7.8 using 4 weight percent NaOH solution followed by 6.92 g EDTA (39 weight percent) to freeze the toner growth. After freezing, the reaction mixture was heated to 85° C., while maintaining the pH at 7.8. Then reduce the pH to 6.98. This toner CY-85 was quenched after coalescence, resulting in a final particle size of 5.83 microns, GSD volume of 1.22, GSD number 1.23, the fines population (1.3-3.0 μm) of 2.94% and circularity 0.962.

The toner slurry was then cooled to room temperature, separated by sieving (25 μm), filtration, followed by washing and freeze dried. A duplicate cyan particle batch CY-86 using the same procedure above resulting in final particle size of 5.89 microns, GSD volume of 1.25, GSD number of 1.25, the final population (1.3-3.0 microns) of 3.65 percent and circularity of 0.957. These two particle batches were combined together and then blended with the following surface additives 0.28 weight percent cerium oxide, 0.5 weight percent PMMA, 0.86 weight percent RX50 silica, 1.29 weight percent RY50L silica, 0.88 weight percent STT100H titanium dioxide, 1.73 weight percent X24 and 0.18 weight percent zinc stearate producing the combined toner CY-85/86 for Xerox 700 machine evaluation.

Example 6

EA Toner CY-88+89

Into a 2 liter glass reactor equipped with an overhead mixer was added 138.67 g emulsion of high molecular amorphous resin A (35.26 weight percent) prepared by standard phase inversion emulsification process, 277.09 g emulsion of the unsaturated polyester resin (88) (17.30 weight percent) prepared by standard phase inversion emulsification process, 37.38 g crystalline resin emulsion (35.09 weight percent), 57.64 g polymethylene wax dispersion (30.25 weight percent) and 62.49 g cyan pigment PB15:3 (18.13 weight percent). Separately 3.39 g $Al_2(SO_4)_3$ (27.85 weight percent) was added in as the flocculent under homogenization. The mixture was heated to 43.7° C. to aggregate the particles while stirring at 200 rpm. The particle size was monitored with a Coulter Counter until the core particles reached a volume average particle size of 4.49 μm with a GSD volume of 1.23, and then 76.58 g of above mentioned high molecular amorphous resin A emulsion and 153.03 g the unsaturated polyester resin (88) emulsion mixture were added as shell material, resulting in a core-shell structured particles with an average particle size of 5.77 microns, GSD volume 1.20. Thereafter, the pH of the reaction slurry was then increased to 7.8 using 4 weight percent NaOH solution followed by 7.27 g EDTA (39 weight percent) to freeze the toner growth. After freezing, the reaction mixture was heated to 85° C., while maintaining the pH at 7.8. Then reduce the pH to 7.05. This toner CY-88 was quenched after coalescence, resulting in a final particle size of 6.14 microns, GSD volume of 1.22, GSD number 1.23, the fines population (1.3-3.0 μm) of 3.32 percent and circularity 0.958.

The toner slurry was then cooled to room temperature, separated by sieving (25 μm), filtration, followed by washing and freeze dried. A duplicate cyan particle batch CY-89 using the same procedure above resulting in final particle size of 6.27 microns, GSD volume of 1.23, GSD number of 1.23, the final population (1.3-3.0 microns) of 1.44 percent and circularity of 0.961. These two particle batches were combined together and then blended with the following surface additives 0.28 weight percent cerium oxide, 0.5 weight percent PMMA, 0.86 weight percent RX50 silica, 1.29 weight percent RY50L silica, 0.88 weight percent STT100H titanium dioxide, 1.73 weight percent X24 and 0.18 weight percent zinc stearate producing the combined toner CY-88/89 for Xerox 700 machine evaluation.

Example 7

EA Toner CY-95+96

Into a 2 liter glass reactor equipped with an overhead mixer was added 127.19 g emulsion of high molecular amorphous resin A (35.29 weight percent) prepared by standard phase inversion emulsification process, 182.67 g emulsion of the unsaturated polyester resin (97) (24.09 weight percent) prepared by standard phase inversion emulsification process, 33.73 g crystalline resin emulsion (35.70 weight percent), 52.91 g polymethylene wax dispersion (30.25 weight percent) and 57.37 g cyan pigment PB15:3 (18.13 weight percent). Separately 3.11 g $Al_2(SO_4)_3$ (27.85 weight percent) was added in as the flocculent under homogenization. The mixture was heated to 47.5° C. to aggregate the particles while stirring at 200 rpm. The particle size was monitored with a Coulter Counter until the core particles reached a volume average particle size of 4.35 μm with a GSD volume of 1.24, and then 70.24 g of above mentioned high molecular amorphous resin A emulsion and 100.88 g the unsaturated polyester resin (lot No. 4798-97) emulsion mixture were added as shell material, resulting in a core-shell structured particles with an average particle size of 5.31 microns, GSD volume 1.20. Thereafter, the pH of the reaction slurry was then increased to 7.8 using 4 weight percent NaOH solution followed by 6.67 g EDTA (39 weight percent) to freeze the toner growth. After freezing, the reaction mixture was heated to 85° C., while maintaining the pH at 7.8. Then reduce the pH to 7.34. This toner CY-95 was quenched after coalescence, resulting in a final particle size of 6.14 microns, GSD volume of 1.22, GSD number 1.25, the fines population (1.3-3.0 μm) of 3.62 percent and circularity 0.977.

The toner slurry was then cooled to room temperature, separated by sieving (25 μm), filtration, followed by washing and freeze dried. A duplicate cyan particle batch CY-96 using the same procedure above resulting in final particle size of 6.41 microns, GSD volume of 1.22, GSD number of 1.25, the final population (1.3-3.0 microns) of 1.44 percent and circularity of 0.959. These two particle batches were combined together and then blended with the following surface additives 0.28 weight percent cerium oxide, 0.5 weight percent PMMA, 0.86 weight percent RX50 silica, 1.29 weight percent RY50L silica, 0.88 weight percent STT100H titanium dioxide, 1.73 weight percent X24 and 0.18 weight percent zinc stearate producing the combined toner CY-95/96 for Xerox 700 machine evaluation.

Toner Performance

Xerographic performance was measured in a Xerox 700 in J-zone as a function of toner age which was calculated from the area coverage of the printed toner.

FIGS. 3A-3D show the improvement in toner J-zone charge aging with lower free fumaric acid in the resin. As shown in FIGS. 3A-3D, as the level of unreacted fumaric acid decreases to <1.1 then the stress J-zone charge aging performance becomes more stable and becomes similar to Comparative Example 1 toner.

Figure 4A:
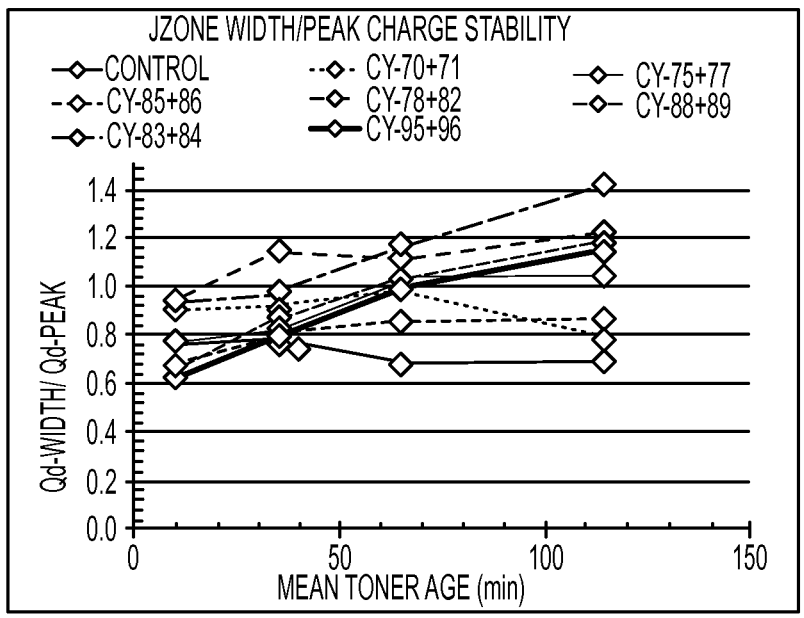
FIGS. 4A-4B are graphs that demonstrate J-zone Qd—width/peak charge stability as a function of mean toner age and the correlation with resin unreacted or free fumaric acid.
Figure 4B:
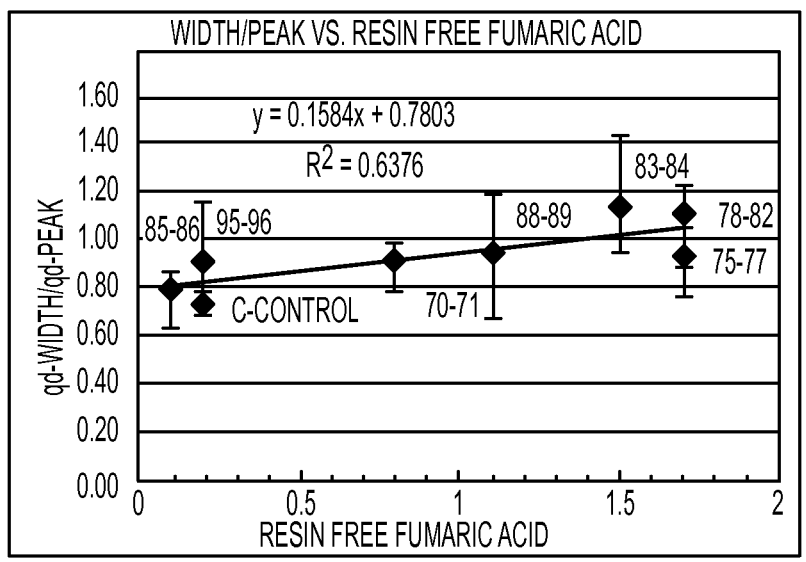

FIGS. 4A-4B show the improvement (lower) normalized charge distribution width in J-zone with toner aging with lower resin free fumaric acid. With lower levels of unreacted fumaric acid, xerographic performance is similar to Comparative Example 1 toner and during aggregation/coalescence the process proceeds similarly to the Comparative Example 1 toner resulting in lower % fine particles.

Figure 5A:
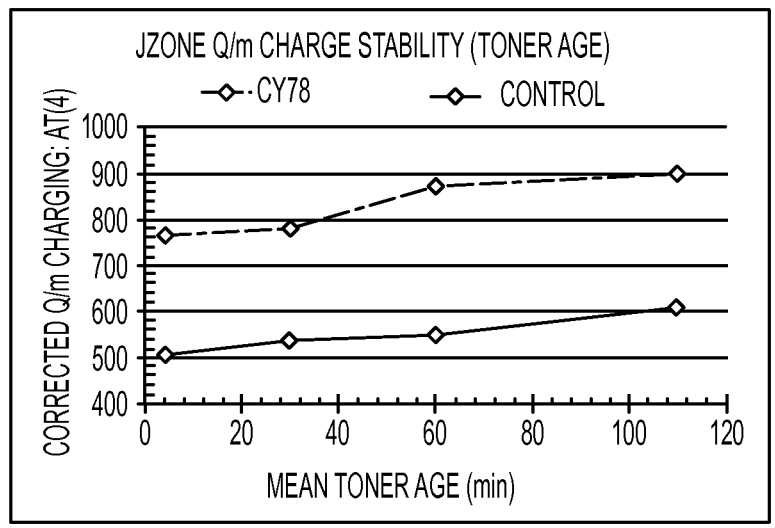
FIGS. 5A-5D are graphs that demonstrate J-zone charge stability as function of mean toner age for the Comparative Example 1 toner and the Comparative Example 2 toner.
Figure 5B:
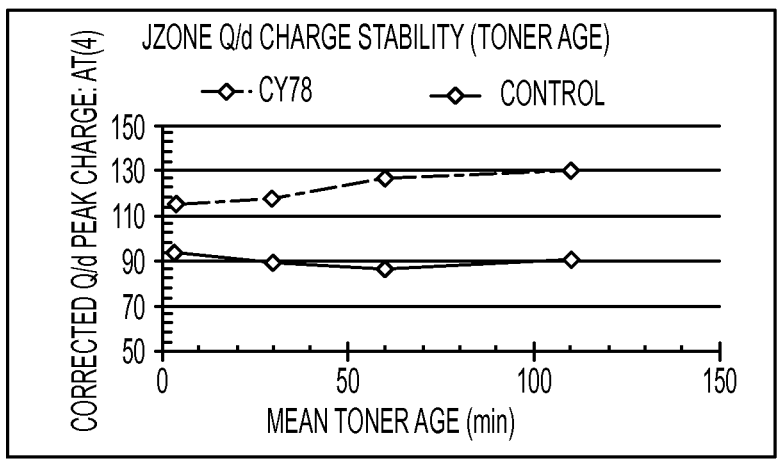
Figure 5C:
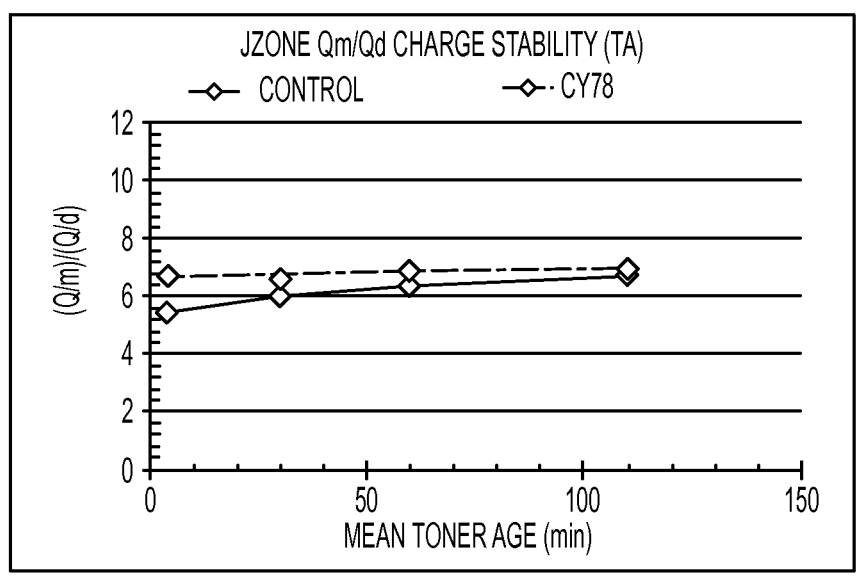
Figure 5D:
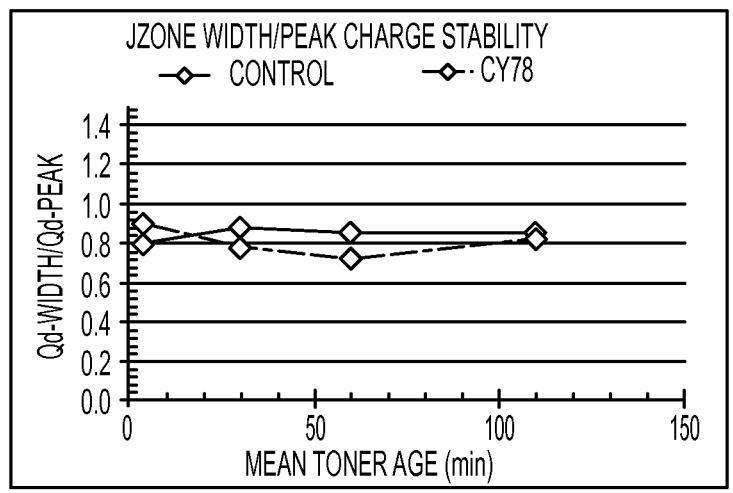

FIGS. 5A-5B show the very poor charge performance of the Comparative Example 2 CY-78 toner with respect to a very high charge level compared to the Comparative Example 1 toner, though the ratio of q/m to q/d and the charge distribution width are similar to the Comparative Example 1 toner. The Comparative Example 1 toner had a low acceptable level of particle fines <3% whereas the Comparative Example 2 toner had a very high level of particle fines at 9.31%. This high level of particle fines was traced back and is cause by high levels of unreacted fumaric acid. When the level of unreacted fumaric acid is >1.1 the xerographic performance shows unacceptable toner aging performance due to increases in charge stability which is not desirable. By keeping the level of unreacted free fumaric acid to <1.1 results in a comparable aggregation/coalescence process with low levels of particle % fines and comparable xerographic performance.

Figure 6A:
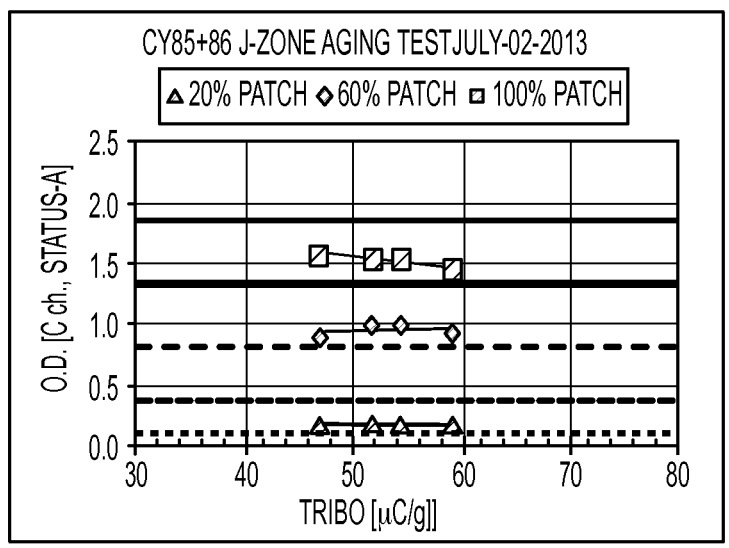
FIGS. 6A-6D provide image quality data for prints made with the evaluated toners.
Figure 6B:
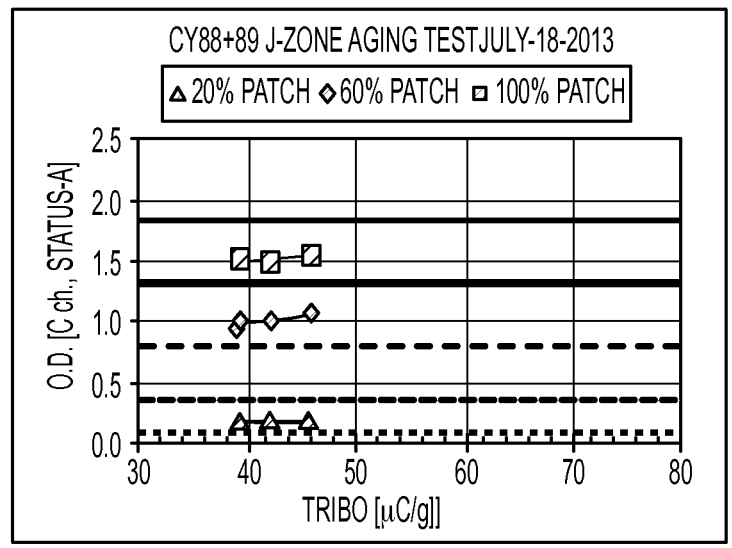
Figure 6C:
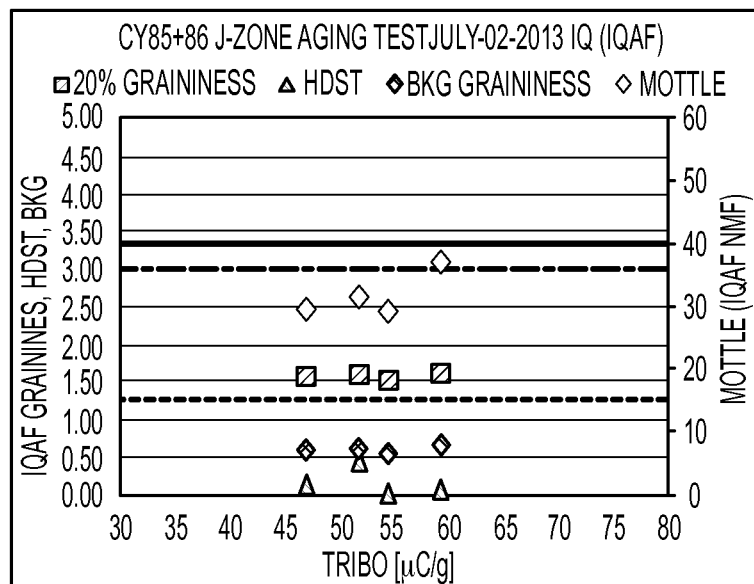
Figure 6D:
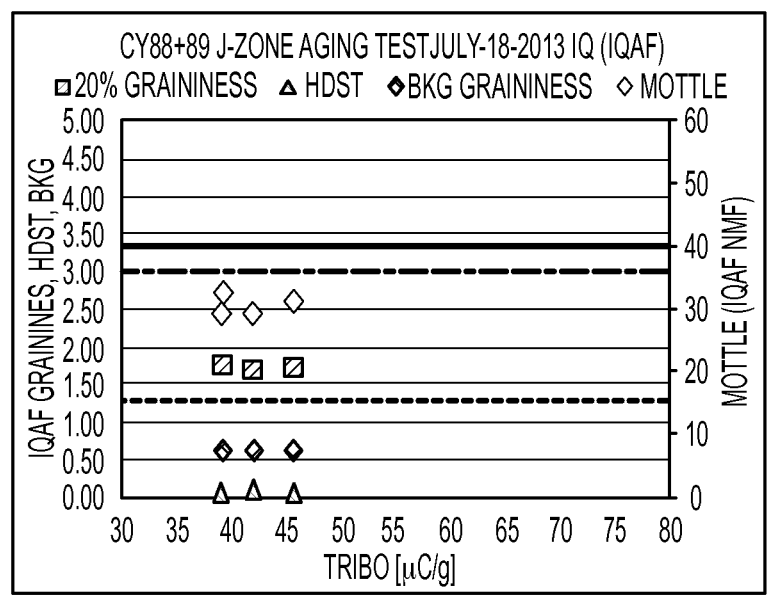

FIGS. 6A-6D show the image quality of prints made with the evaluated toners. Solid area density are seen for CY-85/86 (FIG. 6A) and CY-88/89 (FIG. 6B) and graininess, mottle, halftone starvation and background are seen for toner CY-85/86 (FIG. 6C) and toner CY-88/89 (FIG. 6D). As seen, two of the toners with resin with low free fumaric acid and low fines have excellent image quality compared to the spec ranges for the optical density in FIGS. 6A-6B for the 100%, 60% and 20% area patches on the prints, and excellent graininess, halftone starvation, background (as measured by graininess) and mottle, all within the typical ranges for control toners.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A process for making a toner resin emulsion comprising:
reacting an organic diol with a cyclic alkylene carbonate in the presence of a first catalyst to thereby form a polyalkoxy diol;
reacting the polyalkoxy diol with one or more diacid reagents in the presence of a second catalyst in an esterification reaction;
monitoring an acid value of a resulting mixture produced from the esterification reaction;
subsequently polycondensing the resulting mixture with an unsaturated diacid to form an unsaturated polyester resin;
dissolving the unsaturated polyester resin in an organic solvent to form a solution;
neutralizing the solution of the polyester resin;

adding a sufficient amount of water to the neutralized solution to form a resin emulsion; and removing the organic solvent in the resin emulsion.

2. The process of claim 1, wherein the diol is selected from the group consisting of 1,2-propanediol, 1,3-propanediol, 1,3-butane diol, pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, propoxylated bisphenol A, bis-(4-hydroxy phenyl) methane, 1,1-bis-(4-hydroxy phenyl) ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, and mixtures thereof and which diol is optionally selected in an amount of from about 0.90 mole equivalents to about 1.1 mole equivalents, based on about 1 mole equivalent of unsaturated diacid utilized.

3. The process of claim 1, wherein the first catalyst is present in an amount of from about 0.001 mole percent to about 0.5 mole percent based on the starting organic diol utilized.

4. The process of claim 1, wherein the first catalyst is selected from the group consisting of sodium carbonate, lithium carbonate, potassium carbonate, sodium carbonate, rubidium carbonate, cesium carbonate, beryllium carbonate, magnesium carbonate, calcium carbonate, strontium carbonate, beryllium carbonate, manganese carbonate, barium carbonate and mixtures thereof.

5. The process of claim 1, wherein the second catalyst is selected from the group consisting of tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or mixtures thereof.

6. The process of claim 1, wherein the second catalyst is present in an amount of from about 0.01 mole percent to about 5 mole percent based on the starting diacid or diester utilized.

7. The process of claim 1, wherein the reacting step is performed at a first polymerization temperature of from about 120 to about 250° C.

8. The process of claim 1, wherein the polycondensing step is performed at a second polymerization temperature of from about 150 to about 300° C.

9. The process of claim 1, wherein the reacting step is performed at a mixing rate of from about 5 to about 600 RPM.

10. The process of claim 1, wherein the polycondensing step is performed at a mixing rate of from about 5 to about 600 RPM.

11. The process of claim 1 further including cooling the resulting mixture before the addition of the unsaturated diacid.

12. The process of claim 1, wherein the unsaturated polyester resin has low levels of unreacted starting material.

13. The process of claim 12, wherein the unsaturated polyester resin has low levels of unsaturated diacid.

14. The process of claim 13, wherein unsaturated diacid is present in an amount of less than 1.5 as analyzed by 31P NMR.

15. The process of claim 1, wherein the organic solvent is selected from the group consisting of methylethylketone (MEK), isopropanol, and mixtures thereof.

16. The process of claim 1, wherein the neutralizing step is performed by adding an aqueous solution of base to the solution of the polyester resin.

17. A process for making a toner emulsion comprising:
reacting an organic diol with a cyclic alkylene carbonate in the presence of a first catalyst to thereby form a polyalkoxy diol, wherein the first catalyst is present in an amount of from about 0.001 mole percent to about 0.5 mole percent based on the starting organic diol utilized;
reacting the polyalkoxy diol with one or more diacid reagents in the presence of a second catalyst in an esterification reaction;
monitoring an acid value of a resulting mixture produced from the esterification reaction;
subsequently polycondensing the resulting mixture with an unsaturated diacid to form an unsaturated polyester resin having an acid value of greater than 10.0 mg KOH/g resin;
dissolving the unsaturated polyester resin in an organic solvent to form a solution;
neutralizing the solution of the polyester resin;
adding a sufficient amount of water to the neutralized solution to form a resin emulsion; and
removing the organic solvent in the resin emulsion.

18. A process for making a toner comprising:
reacting an organic diol with a cyclic alkylene carbonate in the presence of a first catalyst to thereby form a polyalkoxy diol;
reacting the polyalkoxy diol with one or more organic diacid reagents in the presence of a second catalyst in an esterification reaction;
monitoring an acid value of a resulting mixture produced from the esterification reaction;
subsequently polycondensing the resulting mixture with an unsaturated diacid to form an unsaturated polyester resin having an acid value greater than 10.0 mg KOH/g resin;
dissolving the amorphous polyester resin in an organic solvent to form a solution;
neutralizing the solution of the polyester resin;
adding a sufficient amount of water to the neutralized solution to form a resin emulsion;
removing the organic solvent from the resin emulsion;
aggregating the emulsion to form toner particles; and
coalescing the toner particles to form the toner.

19. A toner made by the process of claim 18.

20. The toner of claim 19 having a charge of from about 15 to about 80 μC/gram.

* * * * *